United States Patent
Churchill et al.

(10) Patent No.: US 12,111,894 B2
(45) Date of Patent: Oct. 8, 2024

(54) USER EXPERIENCE CONTAINER LEVEL IDENTITY FEDERATION AND CONTENT SECURITY

(71) Applicant: Haworth, Inc., Holland, MI (US)

(72) Inventors: Steven Churchill, San Mateo, CA (US); Rupen Chanda, San Francisco, CA (US); Jingqi Ao, San Mateo, CA (US); Madhuvanthi Guruprasad, Hayward, CA (US)

(73) Assignee: Haworth, Inc., Holland, MI (US)

( * ) Notice: Subject to any disclaimer, the term of this patent is extended or adjusted under 35 U.S.C. 154(b) by 255 days.

(21) Appl. No.: 17/200,731

(22) Filed: Mar. 12, 2021

(65) Prior Publication Data

US 2021/0286861 A1  Sep. 16, 2021

Related U.S. Application Data

(60) Provisional application No. 62/988,733, filed on Mar. 12, 2020.

(51) Int. Cl.
*G06F 21/00* (2013.01)
*G06F 21/10* (2013.01)
*G06F 21/31* (2013.01)

(52) U.S. Cl.
CPC .............. *G06F 21/31* (2013.01); *G06F 21/10* (2013.01)

(58) Field of Classification Search
CPC ........... G06F 21/31; G06F 21/36; G06F 21/10
See application file for complete search history.

(56) References Cited

U.S. PATENT DOCUMENTS 6,640,241 B1 10/2003 Ozzie et al.
8,196,177 B2 6/2012 Hinton, I
(Continued)

FOREIGN PATENT DOCUMENTS

WO 2011098749 A2 8/2011

OTHER PUBLICATIONS

PCT/US2021/022247—International Search Report and Written Opinion dated Jun. 10, 2021, 12 pages.
(Continued)

*Primary Examiner* — Joseph P Hirl
*Assistant Examiner* — Chi D Nguy
(74) *Attorney, Agent, or Firm* — Haynes Beffel & Wolfeld LLP; Andrew L. Dunlap; Franklin M. Schellenberg

(57) ABSTRACT

Systems and methods are provided for controlling display of a workspace. The system includes logic to establish a first level authorization at a display client enabling access to a workspace data set. The workspace data set can have a plurality of entries identifying respective digital assets and locations in the workspace for graphical objects representing the respective digital assets. The plurality of entries can include a particular entry identifying a particular digital asset requiring a second level authorization. The system includes logic to render, for the particular entry, a placeholder graphical object and a prompt. The system includes logic to detect user input indicating selection of the prompt, and in response executing a protocol to establish the second level authorization. Upon establishment of the second level authorization the placeholder graphical object is replaced with a second graphical object to reveal content of the particular digital asset.

48 Claims, 16 Drawing Sheets

(56) References Cited

U.S. PATENT DOCUMENTS

| | | |
|---|---|---|
| 8,208,000 B1 | 6/2012 | Swanson et al. |
| 8,806,355 B2 | 8/2014 | Twiss et al. |
| 9,185,147 B1 | 11/2015 | Keel |
| 9,875,285 B2 | 1/2018 | Bank et al. |
| 10,304,037 B2 | 5/2019 | Foley et al. |
| 10,394,825 B2 | 8/2019 | Bank et al. |
| 10,606,959 B2 | 3/2020 | Dockhorn et al. |
| 10,656,801 B1 | 5/2020 | Goodman |
| 11,126,325 B2 | 9/2021 | Jakobovits et al. |
| 2007/0079249 A1 | 4/2007 | Pall et al. |
| 2009/0182577 A1 | 7/2009 | Squilla et al. |
| 2009/0288007 A1 | 11/2009 | Leacock et al. |
| 2010/0142542 A1 | 6/2010 | Van Wie et al. |
| 2011/0113348 A1 | 5/2011 | Twiss et al. |
| 2011/0268262 A1 | 11/2011 | Jones et al. |
| 2012/0124092 A1* | 5/2012 | Teranishi ............ G06F 21/6218 707/783 |
| 2012/0166242 A1 | 6/2012 | Bentley et al. |
| 2013/0173486 A1* | 7/2013 | Peters .................... G06Q 10/00 705/319 |
| 2014/0215343 A1 | 7/2014 | Ligman et al. |
| 2015/0089623 A1* | 3/2015 | Sondhi .................. H04L 63/205 726/9 |
| 2015/0100503 A1 | 4/2015 | Lobo et al. |
| 2015/0334168 A1 | 11/2015 | Kosslyn |
| 2016/0189112 A1 | 6/2016 | Kidron et al. |
| 2016/0321469 A1 | 11/2016 | Bhogal et al. |
| 2016/0357874 A1 | 12/2016 | Keel et al. |
| 2016/0357971 A1* | 12/2016 | Sinha ..................... H04L 63/10 |
| 2017/0330150 A1 | 11/2017 | Foley et al. |
| 2018/0032493 A1 | 2/2018 | Raleigh et al. |
| 2018/0101616 A1 | 4/2018 | Ma |
| 2018/0359233 A1* | 12/2018 | Alexander .......... H04W 12/062 |
| 2019/0079949 A1 | 3/2019 | Nichols et al. |
| 2019/0108114 A1 | 4/2019 | De Vansa Vikramaratne et al. |
| 2019/0108271 A1 | 4/2019 | Vikramaratne |
| 2019/0121498 A1 | 4/2019 | Jakobovits et al. |
| 2019/0155910 A1 | 5/2019 | Dockhorn et al. |
| 2019/0163671 A1 | 5/2019 | Vengerov et al. |
| 2019/0171837 A1 | 6/2019 | Thoren et al. |
| 2019/0272276 A1 | 9/2019 | Bank et al. |
| 2019/0313059 A1 | 10/2019 | Agarawala et al. |
| 2020/0327171 A1 | 10/2020 | Spataro et al. |
| 2020/0341882 A1 | 10/2020 | Entrekin et al. |
| 2021/0286861 A1 | 9/2021 | Churchill et al. |
| 2022/0267023 A1 | 8/2022 | Baladhandapani et al. |
| 2022/0318755 A1 | 10/2022 | Chanda |
| 2024/0004923 A1 | 1/2024 | Chanda et al. |
| 2024/0037139 A1 | 2/2024 | Chanda et al. |

OTHER PUBLICATIONS

Temoshok et al., Developing Trust Frameworks to Support Identity Federations, National Institute of Science and Technology—NISTIR 8149, dated Jan. 2018, 34 pages. [URL: https://doi.org/10.6028/NIST.IR.8149].

Anonymous, Overview of Google identity management, Google, retrieved on Mar. 6, 2021, 6 pages. Retrieved from the internet [URL: https://cloud.google.com/architecture/identity/overview-google-authentication].

Anonymous, Authorize external services in your Office Add-in, Microsoft, dated Aug. 7, 2019, 4 pages.

Anonymous, Authenticate and authorize with the Office dialog API, Microsoft, dated Sep. 24, 2020, 8 pages.

Anonymous, Reference Architecture, 7 pages, retrieved on Mar. 6, 2021. Retrieved from the internet [URL: https://cloud.google.com/architecture/identity/reference?architectures].

Anonymous, OAuth, Wikipedia, retrieved on Mar. 8, 2021, 9 pages. Retrieved from the internet [URL: https://en.wikipedia.org/wiki/OAuth].

Hardt, The OAuth 2.0 Authorization Framework, Internet Engineering Task Force (IETF), dated Oct. 2012, 76 pages. Retrieved from the internet [URL: https://www.rfc-editor.org/rfc/rfc6749].

Voitiz, Federated Identity vs Single Sign-On, Secret Double Octopus, retrieved on Mar. 12, 2021, 11 pages. Retrieved from the internet [URL: https://doubleoctopus.com/blog/passwordless-101/federated-identity-vs-single-sign-on/].

PCT/US2021/022247—International Preliminary Report on Patentability dated Sep. 22, 2022, 8 pages.

Anonymous, How to: Use the portal to create an Azure AD application and service principal that can access resources, Microsoft, dated Jun. 26, 2020, 13 pages.

Anonymous, Security Assertion Markup Language, Wikipedia, retrieved on Mar. 11, 2021, 11 pages. Retrieved from the internet [URL: https://en.wikipedia.org/wiki/Security_Assertion_Markup_Language].

Campbell et al., Security Assertion Markup Language (SAML) 2.0 Profile for OAuth 2.0 Client Authentication and Authorization Grants, Internet Engineering Task Force (IETF), dated May 2015, 15 pages. [URL: https://www.rfc-editor.org/rfc/rfc7522].

* cited by examiner

AUTHORIZATON TABLE 610
(1/2)

| USER ACCT | IDSP | ersType | ersScope | accessToken |
|---|---|---|---|---|
| 0eef40k48zP9ZrP... | z | o365 | openid offline_access User.Read Files ... | eyJ0eZAiOiJK1QiLCXbw8... |
| 70tmyXzwqQcyIM... | y | o365 | openid offline_access User.Read Files ... | eyJ0eZAiOiJK1QiLCJub2... |
| jcKaPWAl5twn6A... | x | cApp | openid offline_access User.Read Files ... | eyJ0eZAiOiJK1QiLCQry7... |
| ... | ... | ... | ... | ... |

615, 620, 625

AUTHORIZATON TABLE 610
(2/2)

| refreshToken | accessTokenExpiry | refreshTokenExpiry | accessToken CreatedAt | refreshToken CreatedAt | ... |
|---|---|---|---|---|---|
| QAQAAA_qYbH8Z... | 3599 | NULL | 2021-02-13 22:27:54 | 2021-02-13 22:27:54 | |
| QAQAAA_qYbH84... | 3599 | NULL | 2021-02-13 14:57:09 | 2021-02-13 14:57:09 | |
| QAQAAA_qYbH8C... | 3599 | NULL | 2021-02-17 22:19:35 | 2021-02-17 22:19:35 | |
| ... | ... | ... | ... | ... | ... |

EXTERNAL RESOURCE LINK (ERLink) 705

```
{
  ownerMetadata: {
    "email": "idfed.steve1@Workspace.com"
    "driveID": "b!ImB8agHo1Eipr8uUp51R0uefCl_OczVDrKC-DSb5h2b!ROJ1ROJoX87cTaVeJg93CIUR"
  },
  "erSType": "o365",
  "ersScope": "openid offline_access User.Read Files.Read Files.Read.all",
  "ersInfo": {
    "erLocalName": "my-powerpoint.pptx",
    "mediaType": "application/vnd.openxmlformats-officedocument.presentationml.presentation",
    "erLinkInfo": "b!ImB8agHo1Eipr8uUp51R0uefCl_Ocz...1UR/items/01UN4Y2s5UYVHA1VBBKLJBBBNUZLA"
  },
  "ersPrincipalCreatingLink": "idfed.steve1@Workspace.com"
}
```

FIG. 7

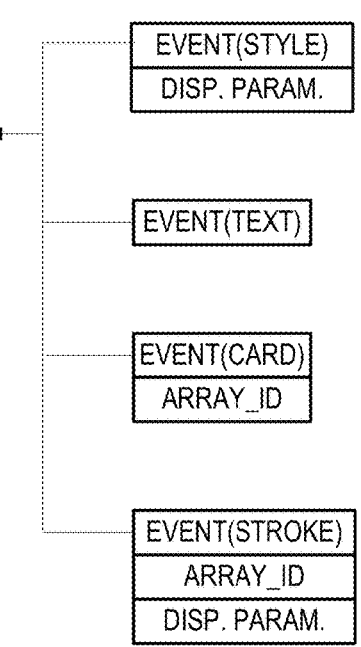
FIG. 10A
FIG. 10B
FIG. 10C
FIG. 10D
FIG. 10E
FIG. 10F
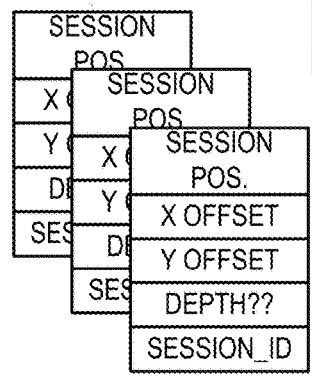
FIG. 10G

USER EXPERIENCE CONTAINER LEVEL IDENTITY FEDERATION AND CONTENT SECURITY

PRIORITY APPLICATION

This application claims the benefit of U.S. Provisional Patent Application No. 62/988,733 filed 12 Mar. 2020; which application is incorporated herein by reference.

BACKGROUND

Field

The present technology relates to collaboration systems that enable users to participate in collaboration sessions from multiple locations.

Description of Related Art

Collaboration systems are used in a variety of environments to allow users to contribute and participate in content generation and review. Users of collaboration system can join collaboration sessions from locations around the world. A participant OID in a collaboration session can share content (or digital assets) such as documents, spreadsheets, slide decks, images, videos, line drawings, annotations, etc. with other participant OIDs in the collaboration session by adding them to the workspace. However, some digital assets are encumbered by security protocols, for authentication of the requester and authorization of access to the content of the digital asset. These security protocols, while they must be preserved, can become a limitation on the useability of the workspace in some settings.

It is desirable to provide a system that can more effectively and automatically set permissions for access to content of digital assets during a collaboration session when participant OIDs share content in a shared workspace.

SUMMARY

A system and method for operating a system are provided for controlling display of a workspace, where a workspace is a digital construct for organizing digital assets by assigning coordinates or locations to digital assets in a virtual space having two or three dimensions in the manner of a whiteboard. Graphical objects in the workspace can be displayed on a display client according to their coordinates in the workspace.

Technology is provided to enable display of content of digital assets in a shared workspace, in which an operative identity OID is established with a workspace server by a participant (hereinafter, "participant OID") linked to a browser or other display client application to enable access a workspace domain including the shared workspace using the display client. A shared workspace can include links to digital assets stored in a resource server which can be external to the workspace domain accessible based on the participant OID. Permission to access the digital asset at different authorization levels, such as read-only, read-write and so on can be managed by the resource server. The resource server can require an account with the resource server, and can specify for particular digital asset or group of digital assets an authorization level for individual accounts. The resource server can authorize one or more accounts with "owner" permissions (hereinafter "owner account") with authority to grant permissions to access the digital assets to another party, such as another account with the resource server.

A method is described for controlling display of a workspace including executing a protocol to establish a first level authorization at a display client on a network node using a participant OID, enabling access to a workspace data set. The workspace data set can have a plurality of entries, entries in the plurality of entries can identify, or provide links to, respective digital assets and locations in the workspace for graphical objects representing the respective digital assets. The plurality of entries can include a particular entry identifying a particular digital asset requiring a second level authorization using an authorization token from the owner account in a resource server. The method includes parsing the workspace data set to identify entries for digital assets having locations within a client viewport region of the workspace to be displayed on a client display, and rendering graphical objects on a display representing the identified digital assets. The method includes for the particular entry rendering a placeholder graphical object and a prompt for requesting access to the particular digital asset. The method includes detecting user input originating from the display client linked to the participant OID, indicating selection of the prompt, and in response executing a protocol to establish the second level authorization for the display client. Upon establishment of the second level authorization, the method includes replacing the placeholder graphical object with a second graphical object to reveal content of the particular digital asset.

The particular digital asset can be a file stored by a resource server, and the content revealing, second graphical object can be a thumbnail, or a "web-native view" via a window or inline frame (e.g., iframe) on the display populated with content of the digital asset controlled by the resource server. For example, the digital asset can be a document, image or video hosted by an external resource provider, which controls display of content inside the window or inline frame, including providing content of the digital asset and tools supporting editing, navigating and annotating the content.

The particular entry in the workspace data set protected by the second level authorization protocol, can include a resource link assigned to the particular digital asset. The protocol to establish the second level authorization includes sending the resource link to a federated authorization server on a second network node. For clarity of the description, reference is made to a particular entry, suggesting the simple case in which there is only one. Of course, there can be many digital assets in a given workspace data set requiring possibly different, respective second level authorizations.

The federated authorization server can store an authorization table in a database for a plurality of participant OIDs, providing federated authorization services for the workspace system. The authorization table can store access tokens for resource servers granted to the participant OIDs. The authorization server can include a refresh operation, to maintain valid tokens for participant IODs over a long term, so a participant OID can be used without requiring the owner account and participant OID to execute re-authenticate and re-authorize protocols each time access to the digital asset is desired through the workspace system. In some embodiments, the authorization server can establish an account with the resource server with permissions to receive and store access tokens and refresh tokens on behalf of participant OIDs, implementing a virtual long lived token by refresh operations using the refresh token as needed or from time to time.

In one embodiment, a display client sends a resource link to the federated authorization server when parsing the workspace data set to identify objects in a viewport of the workspace to be displayed at the display client. The resource link identifies a resource server and a digital asset. If the authorization table at the federated authorization server includes a valid access token for the resource server storing the digital asset for particular participant OIDs, then the federated authorization server forwards an access request to the resource server using the access token, to access the digital asset for delivery to the display client of the participant OID, where the content can be rendered on the display.

If there is no valid access token for the particular resource server in the authorization table for the participant OID, then a sequence to obtain authorization is required. In some embodiments, this can include causing the display client to display a prompt to the participant. The prompt can be driven by the resource server in a window on the display in some embodiments. For example, the resource server can determine whether a display client access token for the display client for access to the resource server is present, such as an authorization token in a browser cookie be obtained by a login via the display client using an account owned at the resource server by the participant. If the display client access token is not present, then the resource server can present an interface via the display client on the display for the participant to login. Thereafter, to obtain a resource an access token for the particular digital asset, the resource server can present an interface via the display client on the display for the participant to request permission from the owner account for the digital asset. This request for permission prompts the owner account to access the resource server for the purposes of generating a granting and delivering a valid resource access token for the participant OID with an authorization level set by an owner account, to be sent to the authorization server and stored in the authorization table. Upon receipt of the valid resource access token from the resource server, an approval message can be delivered for example to the display client of the participant OID. After receiving the approval message, or otherwise after an interval of time, the participant OID can be used invoke the second level authorization protocol using the valid resource access token via the authorization server to enable delivery of content of the digital asset from the resource server to the display client for display.

The resource access token linked to the particular participant OID and resource server can further include a time duration indicating a time limit, or other conditions, for the second level authorization to access the particular digital asset. In some embodiments, the authorization server can use the resource access token to obtain a refresh token on behalf of the participant OID, and the authorization server can refresh the access token on behalf of the participant OID from time to time or as needed, to establish a virtual long lived token, without requiring the participant to re-gain permission from the owner account, allowing long lived access to the particular digital asset via the workspace.

In one embodiment, the method includes displaying a prompt on the display of the participant OID for adding a protected digital asset to the workspace. In response to the prompt, the client driver can provide a login dialog for the participant to login to the resource server (if needed), and after successful login, the resource server can generate a dialog (e.g., a "picker") for selecting digital assets and setting authorization levels for access to the digital assets, to be added to the workspace data set. In some embodiments, an authorization dialog from the resource server is presented before the picker. The selected digital assets are added to the workspace by providing a resource link in an entry in the workspace data set, usable as discussed above to enable delivery of content of the selected digital asset to the display client for display. The resource link can include an owner account identifier, a resource server identifier and a digital asset identifier. In some embodiments, the resource link can include an access scope parameter indicating authorization levels for the digital asset, or for an issuer (tenant ID).

Adding an entry to the workspace data set can include sending a message to the workspace server and to other network nodes accessing the workspace using other participant OIDs, which add the entry to the respective versions of workspace data set. The added entry can include a resource link for the particular digital asset being added.

In one embodiment, the workspace can include a canvas object defining a region in the workspace, and the workspace data set can include entries for digital assets having locations within the region defined by the canvas object. The canvas object can be used to impose a second level authorization protocol for access to contents of digital assets having coordinates inside the canvas object. For this embodiment, a method is described that includes rendering a placeholder canvas graphical object and a canvas access prompt for requesting access to digital assets in the region defined by the canvas object. The method includes detecting user input indicating selection of the canvas access prompt, and in response executing a protocol to establish a canvas second level authorization for the display client. The method includes upon establishment of the canvas second level authorization, replacing the placeholder canvas graphical object with graphical objects revealing content of the digital assets having locations within the region defined by the canvas object. An authorization table can include a list of digital assets having coordinates within the canvas region, with an owner account and access tokens for authorized participant OIDs. For a participant OID without a valid access token, a procedure like that described above for a resource server can be executed for a canvas server linked to the workspace system, to gain an access token from the owner account of the canvas, and update the authorization table. For a participant OID with a valid access token for the canvas object, the canvas placeholder graphical object can be replaced with a canvas graphical object revealing digital assets inside the canvas.

A method for controlling display of a workspace is described, comprising using a first level authorization protocol for a plurality of participant OIDs to authenticate and authorize respective display clients to access a workspace domain including workspace data set. In response to a request from the display client, the method includes sending the workspace data set to the respective display clients, the workspace data set having a plurality of entries, entries in the plurality of entries identifying digital assets and locations in the workspace for graphical objects representing the digital assets, the plurality of entries including entries identifying particular digital assets requiring second level authorizations from resource servers outside the workspace domain. The method includes executing a federated authorization server to obtain and maintain resource access tokens usable to establish second level authorizations to access resource servers outside the workspace domain for display clients authorized to access the workspace domain by the plurality of participant OIDs for access to content of the particular digital assets. The method can include maintaining an authorization table accessible by the federated authorization server, the authorization table including entries for the plurality of participant OIDs storing the resource access tokens. The resource access tokens can be long lived tokens, or in some embodiments virtual long lived tokens based on the use of refresh tokens.

Systems and computer program products which can execute the methods are also described herein.

Other aspects and advantages of the present technology can be seen on review of the drawings, the detailed description and the claims, which follow.

BRIEF DESCRIPTION OF THE DRAWINGS

The technology will be described with respect to specific embodiments thereof, and reference will be made to the drawings, which are not drawn to scale, and in which:

FIG. 6 presents an example of an authorization table that can store access records for participant OIDs.

FIG. 7 presents an example external resource link that can include information about the digital asset.

FIG. 10A, FIG. 10B, FIG. 10C, FIG. 10D, FIG. 10E, FIG. 10F and FIG. 10G (collectively FIG. 10) are simplified diagrams of data structures for parts of the workspace data.

DETAILED DESCRIPTION

A detailed description of embodiments of the present technology is provided with reference to the FIGS. 1-14.

The following description is presented to enable a person skilled in the art to make and use the technology, and is provided in the context of a particular application and its requirements. Various modifications to the disclosed embodiments will be readily apparent to those skilled in the art, and the general principles defined herein may be applied to other embodiments and applications without departing from the spirit and scope of the present technology. Thus, the present technology is not intended to be limited to the embodiments shown, but is to be accorded the widest scope consistent with the principles and features disclosed herein.

Environment

We describe a collaboration environment in which users participate in an interactive collaboration session from network nodes located across the world. A user can use a participant OID to join and participate in the collaboration session at a first level of authorization, using display clients, such as browsers, for large format digital displays, desktop and laptop computers, or mobile computing devices. Collaboration systems are used in a variety of environments to allow users to contribute and participate in content generation and review. Users of collaboration systems can join collaboration sessions from remote locations around the globe. A participant OID in a collaboration session can be used to establish authentication of participants and authorization for display clients linked to the participant OID to access and share digital assets such as documents, spreadsheets, slide decks, images, videos, line drawings, annotations, etc. with other participant OIDs in a shared workspace.

The digital assets can be stored in an external system such as a cloud-based storage system or in a local storage. Due to security and privacy concerns, many organizations do not want participant OIDs from outside their organization to make copies of the organization's digital assets and upload these copies to other storage servers for collaboration sessions. However, in such cases, the organizations may allow external participant OIDs in a collaboration session to temporarily access the digital assets from the servers at which the digital assets are stored. The technology disclosed enables such collaboration by providing a link to a digital asset to participant OIDs to access digital asset from the external storage servers without downloading a copy of the digital asset to their respective workspaces. The accessed digital asset can be viewed and/or edited in a window or a frame in the workspace depending on the access scope authorized by the owner account of the digital asset.

Figure 1A:
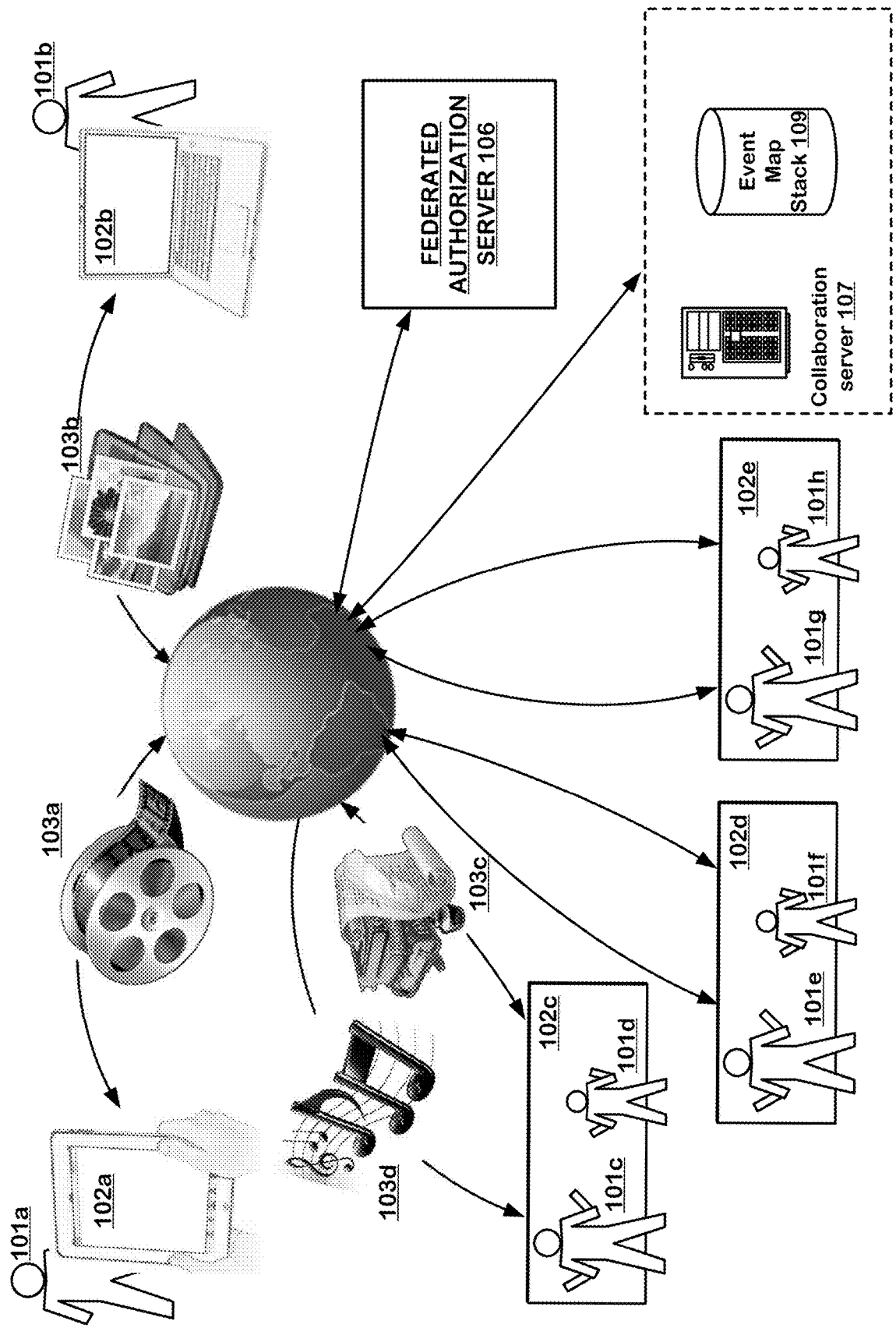
FIGS. 1A and 1B (collectively FIG. 1) illustrate example aspects of a digital display collaboration environment.

FIG. 1A illustrates example aspects of a digital display collaboration environment. In the example, a plurality of users 101a-h (collectively 101), may desire to collaborate with each other, including sharing digital assets including for examples complex images, music, video, documents, and/or other media, all generally designated in FIG. 1A as 103a-d (collectively 103). Some of the digital assets are stored in resource servers, which maintain security protocols protecting access to the digital assets independent of the workspace. Others of the digital assets may be available to participants in the workspace without further security protocols.

The users in the illustrated example can use a variety of devices configured as electronic network nodes, in order to collaborate with each other, for example a tablet 102a, a personal computer (PC) 102b, and many large format displays 102c, 102d, 102e (collectively devices 102). The network nodes can be positioned in locations around the world. The user devices, which are referred to as client-side network nodes, have display clients, such as browsers, controlling displays on which a displayable area is allocated for displaying graphical objects in a workspace. The displayable area for a given user may comprise the entire screen of the display, a subset of the screen, a window to be displayed on the screen and so on. The display client can set a viewport in the workspace, which identifies an area in the coordinate system of the workspace, to be rendered in the displayable area.

The display clients at client-side network nodes 102a, 102b, 102c, 102d, 102e are in network communication with a collaboration server 107 configured at a server-side network node. The collaboration server 107 can maintain participant accounts, by which access to one or more workspace data sets can be controlled. A workspace database 109 accessible by the collaboration server 107 can store the workspace data sets, which can comprise spatial event maps.

Also, the collaboration server can be linked with a federated authorization server 106. The federated authorization server 106 manages access to resource servers storing digital assets in the workspace data set on behalf of a plurality of participant OIDs usable to gain access to workspace data sets via accounts at the collaboration server 107.

As used herein, a network node is an active electronic device that is attached to a network, and is capable of sending, receiving, or forwarding information over a communications channel. Examples of electronic devices which can be deployed as network nodes, include all varieties of computers, display walls, work stations, laptop and desktop computers, hand held computers and smart phones.

As used herein, the term "database" does not necessarily imply any unity of structure. For example, two or more separate databases, when considered together, still constitute a "database" as that term is used herein.

The method for controlling display of a workspace includes executing a protocol to establish a first level authorization at a display client enabling access to a workspace data set. The workspace data set can have entries identifying a plurality of digital assets linked to graphical objects having coordinates in the workspace. At least one particular digital asset in the plurality of digital assets can be linked to a first graphical object, such as a placeholder icon, authorized by the first level authorization. The method includes parsing the workspace data set to identify graphical objects having locations within a client viewport authorized by the first level authorization. The method includes rendering the identified graphical objects on a display. The method includes detecting user input indicating selection of the first graphical object. In response, the method includes executing a protocol to establish the second level authorization at a display client replacing the first graphical object with a content revealing graphical object.

In one embodiment, the first graphical object can be a placeholder graphical object including a user interface element to receive user input indicating selection of the first graphical object. The content-revealing object can include a window or inline frame revealing all or a part of the content from the digital asset, examples of which include an image, a text document, a video, and application window.

In one embodiment, the particular digital asset in the plurality of digital assets can be a canvas linked to a canvas graphical object having coordinates defining an area in the workspace. The method includes executing the protocol to establish the first level authorization for the display client enabling access to the workspace data set. The method includes parsing the workspace data set to identify entries for digital assets having coordinates inside boundaries of the canvas graphical object. The method includes executing, in response to location of digital assets inside the boundaries of the canvas graphical object, the protocol to establish the second level authorization for the display client.

Workspace

A collaboration session can include access to a data set having a coordinate system establishing a virtual space, termed the "workspace", in which digital assets are assigned coordinates or locations in the virtual space. The workspace can be characterized by a multi-dimensional and in some cases two-dimensional Cartesian plane with essentially unlimited extent in one or more dimensions for example, in such a way that new content can be added to the space, that content can be arranged and rearranged in the space, that a user can navigate from one part of the space to another. The workspace can also be referred to as a "container" in the sense it is a data structure that can contain other data structures or links to other objects or data structures.

Viewport

Display clients at participant client nodes in the collaboration session can display a portion, or mapped area, of the workspace, where locations on the display are mapped to locations in the workspace. A mapped area, also known as a viewport within the workspace is rendered on a physical screen space. Because the entire workspace is addressable in for example Cartesian coordinates, any portion of the workspace that a user may be viewing itself has a location, width, and height in Cartesian space. The concept of a portion of a workspace can be referred to as a "viewport". The coordinates of the viewport are mapped to the coordinates of the screen space on the display client which can apply appropriate zoom levels based on the relative size of the viewport and the size of the screen space. The coordinates of the viewport can be changed which can change the objects contained within the viewport, and the change would be rendered on the screen space of the display client. Details of workspace and viewport are presented in our United States Application Publication No. US 2019/0121498, entitled, "Virtual Workspace Including Shared Viewport Markers in a Collaboration System," filed 23 Oct. 2017, which is incorporated by reference as if fully set forth herein.

Spatial Event Map

The "unlimited workspace" problem includes the need to track how people and devices interact with the workspace over time. In order to solve this core problem, the workspace data set can implement a "Spatial Event Map". The Spatial Event Map contains information needed to define objects and events in a workspace. It is useful to consider the technology from the point of view of space, events, maps of events in the space, and access to the space by multiple users, including multiple simultaneous users. The spatial event map contains information to define objects and events in a workspace. The spatial event map can include events comprising data specifying virtual coordinates of location within the workspace at which an interaction with the workspace is detected, data specifying a type of interaction, a graphical object associated with the interaction, and a time of the interaction.

A "spatial event map" contains content in the workspace for a given collaboration session. The spatial event map defines arrangement of digital assets (or objects) on the workspace. Their locations in the workspace are important for performing gestures. The spatial event map contains information needed to define digital assets, their locations, and events in the workspace. A spatial events map system, maps portions of workspace to a digital display e.g., a touch enabled display. Details of workspace and spatial event map are presented in U.S. Pat. No. 10,304,037, entitled, "Collaboration System Including a Spatial Event Map," filed Nov. 26, 2013, which is incorporated by reference as if fully set forth herein.

Events

Interactions with the workspace are handled as events. People, via tangible user interface devices, and systems can interact with the workspace. Events have data that can define or point to a target graphical object to be displayed on a physical display, and an action as creation, modification, movement within the workspace and deletion of a target graphical object, and metadata associated with them. Metadata can include information such as originator, date, time, location in the workspace, event type, security information, and other metadata.

Tracking events in a workspace enables the system to not only present the spatial events in a workspace in its current state, but to share it with multiple users on multiple displays, to share relevant external information that may pertain to the content, and understand how the spatial data evolves over time. Also, the spatial event map can have a reasonable size in terms of the amount of data needed, while also defining an unbounded workspace.

User Accounts

The collaboration system can support "participant accounts" of users of the collaboration system, which rely on authorization protocols to establish participant OIDs for access to workspace datasets. The participants in the collaboration session can login to the workspace using credentials of their "participant accounts" which can be maintained by the collaboration application using a "user accounts table". These identities are also referred to as internal identities. The technology disclosed also allows users to login to the workspace using external identities provided by external identity providers such as Google™, Okta™, Azure Active Directory, etc. The combination of a participant account and the internal or external identity provider, referred to as a participant operative identity OID, generate a record, such as workspace access tokens, for the display client of the participant which enables access to the workspace. A participant account may have multiple identity providers available. Thus, to login to a workspace, the participant may select an identity provider. Upon successful login, a workspace access token, such as a Security Assertion Markup Language SAML token is delivered to the display client, linking the participant account identifier, the identity service provider and a workspace domain defined by authorizations associated with the operative identifier, thereby establishing a participant operative identity for utilization of resources within a workspace domain. See, Security Assertion Markup Language, Wikipedia, Mar. 11, 2021.

First and Second Level Authorization Protocols

Logging in to the workspace requires establishing the first level authorization protocol. The first level authorization protocol includes use of internal or external identities for authentication during login to identify the user. The workspace server can include a data structure (such as a table or a data set) listing users (or participant OIDs) authorized to receive a spatial event map (or SEM).

The second level authorization, in some embodiments, can require action by a different user and not authorized under the requesting participant OID alone. Thus, a second authorization protocol is required by which an "owner account" of the digital asset is required to login to the resource server, and grant suitable permissions for the requesting participant.

Security Protocol

A security protocol can include three parts: identification, authentication, authorization. Also, an accounting process can be included.

1: Identification

The users of the collaboration system can create an account in the collaboration system to join collaboration sessions, create workspaces, etc. The users of the collaboration system can create an account in the resource servers storing or controlling access to digital assets linked to the collaboration session. The identifier in user accounts tables can be used to identify a user of the collaboration system.

2: Authentication

Authentication of an identified user can include a protocol requiring passwords or other credentials authenticate them. The collaboration system or external identity servers, can use the credentials of respective users to authenticate the identified users.

3: Authorization

Authorization refers to the actions to be enabled upon identification and authentication of a user. For example, upon access to a document, authorization can be limited by the permission, also referred to as authorization level, established for the user. For a document, the permission may have levels such as read only, or read and write, etc.

Figure 1B:
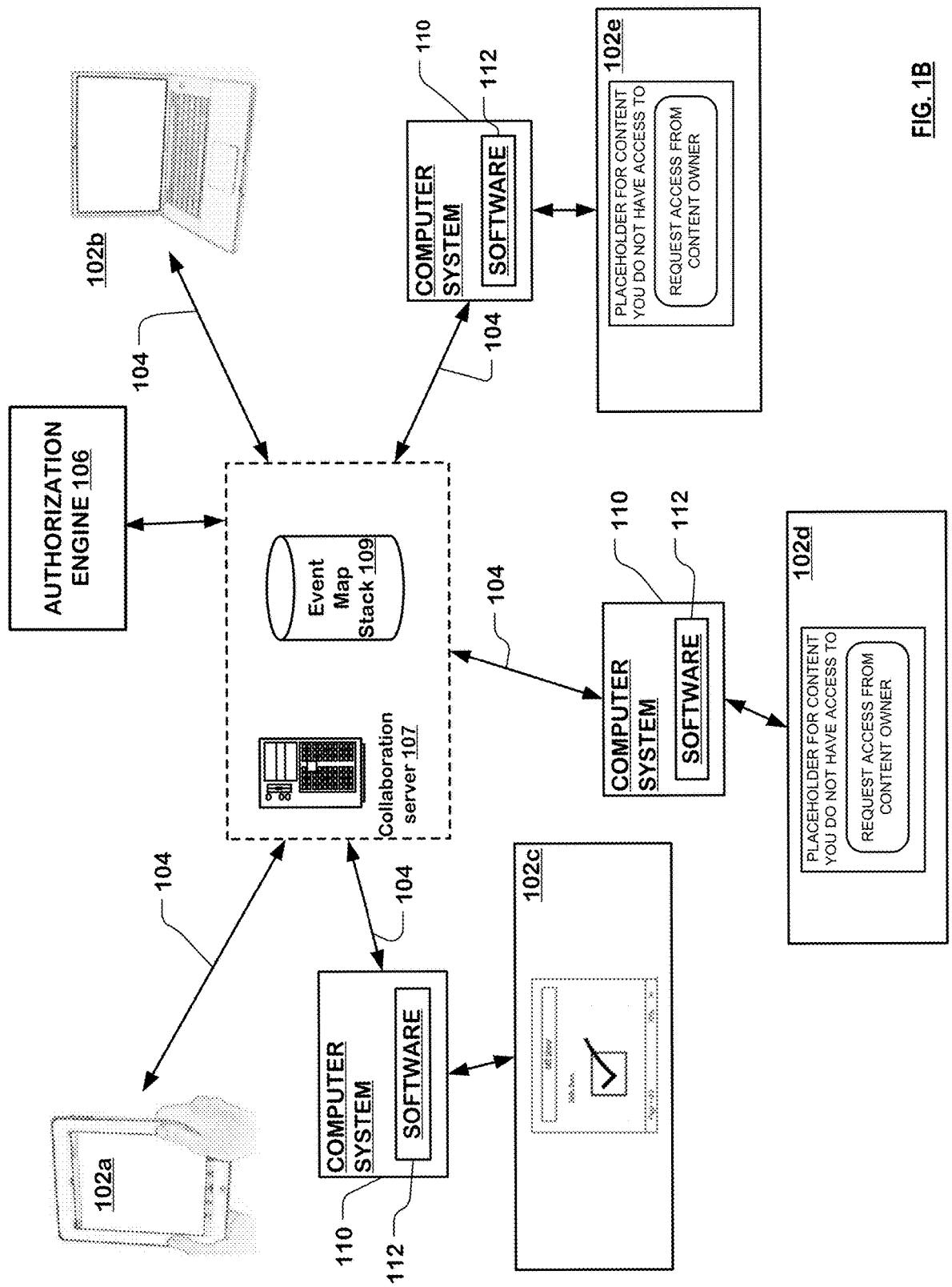

FIG. 1B illustrates the same environment as in FIG. 1A. The application running at the collaboration server 107 can be hosted using Web server software such as Apache or nginx. It can be hosted for example on virtual machines running operating systems such as LINUX. The server 107 and authorization engine 106 are heuristically illustrated in FIG. 1B as a single computer. However, the architecture can involve systems of many computers, each running server applications, as is typical for large-scale cloud-based services. The server and authorization engine include a communication module which can be configured for various types of communication channels, including more than one channel for each client in a collaboration session. For example, near-real-time updates across the network, client software 112 can communicate with the communication modules via using a message-based channel, based for example on the Web Socket protocol. For file uploads as well as receiving initial large volume workspace data, the client software can communicate with the server communication module via HTTP. The server and authorization engine can run front-end programs written for example in JavaScript and HTML using Node.js, support authentication/authorization based for example on OAuth, and support coordination among multiple distributed clients. The front-end programs can be written using other programming languages and web-application frameworks such as in JavaScript served by Ruby-on-Rails. The server communication module can include a message-based communication protocol stack, such as a Web Socket application, that performs the functions of recording user actions in workspace data, and relaying user actions to other clients as applicable. The systems can run on the node.JS platform for example, or on other server technologies designed to handle high-load socket applications.

The federated authorization engine can include an OAuth storage database to store access tokens providing access to the digital assets. The event map stack database 109 includes a workspace data set including events in the collaboration workspace and graphical objects distributed at virtual coordinates in the virtual space. Examples of graphical objects are presented above in description of FIG. 1A, such as images, music, video, documents, application windows and/or other media. Other types of graphical objects can also exist on the workspace such as annotations, comments, and text entered by the users.

Figure 2:
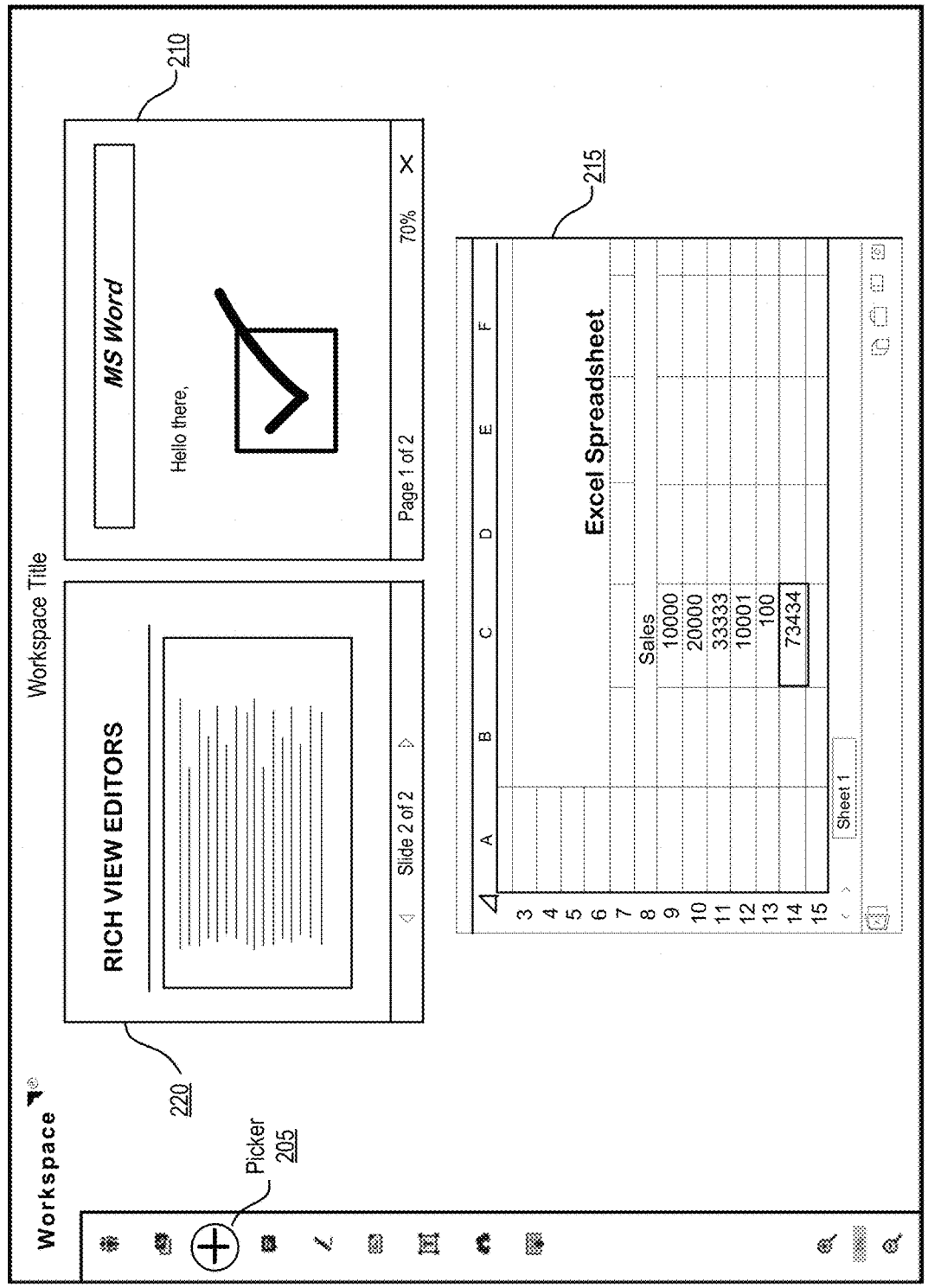
FIG. 2 presents examples of content-revealing graphical objects authorized by a first level authorization and displayed on a workspace.

FIG. 2 shows an example workspace user interface on a display client, including viewport encompassing multiple graphical objects (e.g., 210, 215, 220) located within the viewport, such as graphical objects representing documents from Microsoft™ Office 365™ cloud-based office productivity suite. In this example, contents of the digital assets represented by the graphical objects 210, 215 and 220 are revealed on the display. The graphical object representing a particular digital asset can include for some digital assets stored in a resource server, a window or an inline frame graphical object in which the content of the digital asset can be revealed. For a contemporary example, Office 365™ resource server can provide the rendering logic for an Excel™ spreadsheet or a Word™ file within the window or frame graphical object. The window graphical object can comprise in some embodiments a thumbnail graphic, selection of which can launch JavaScript (or other computer instructions) in the frame/window that exposes the page/sheet/etc. currently being viewed/edited. The display client can view and/or edit the digital asset within the window. Any edits to the digital asset are saved to the external storage server. In some embodiments, a digital asset of this type is not downloaded to the client node The workspace user interface can present a prompt 205 which is used to launch a document "picker" as shown in FIG. 2. The workspace user interface responds to the selection of the "picker" prompt, to launch a procedure for adding a digital asset to the workspace. For example, the procedure can be driven by a resource server through an iframe or using a popup window for example, which displays a file selection dialog box (not shown) upon receiving input from the user indicating activation of the "picker" 205. In case the user has not logged in to the resource server, the procedure can include before launching the picker, first presenting a prompt for the user to login to an account at the resource server and an authorization dialog for the resource server, and then the resource server can generate the picker dialog.

Figure 3:
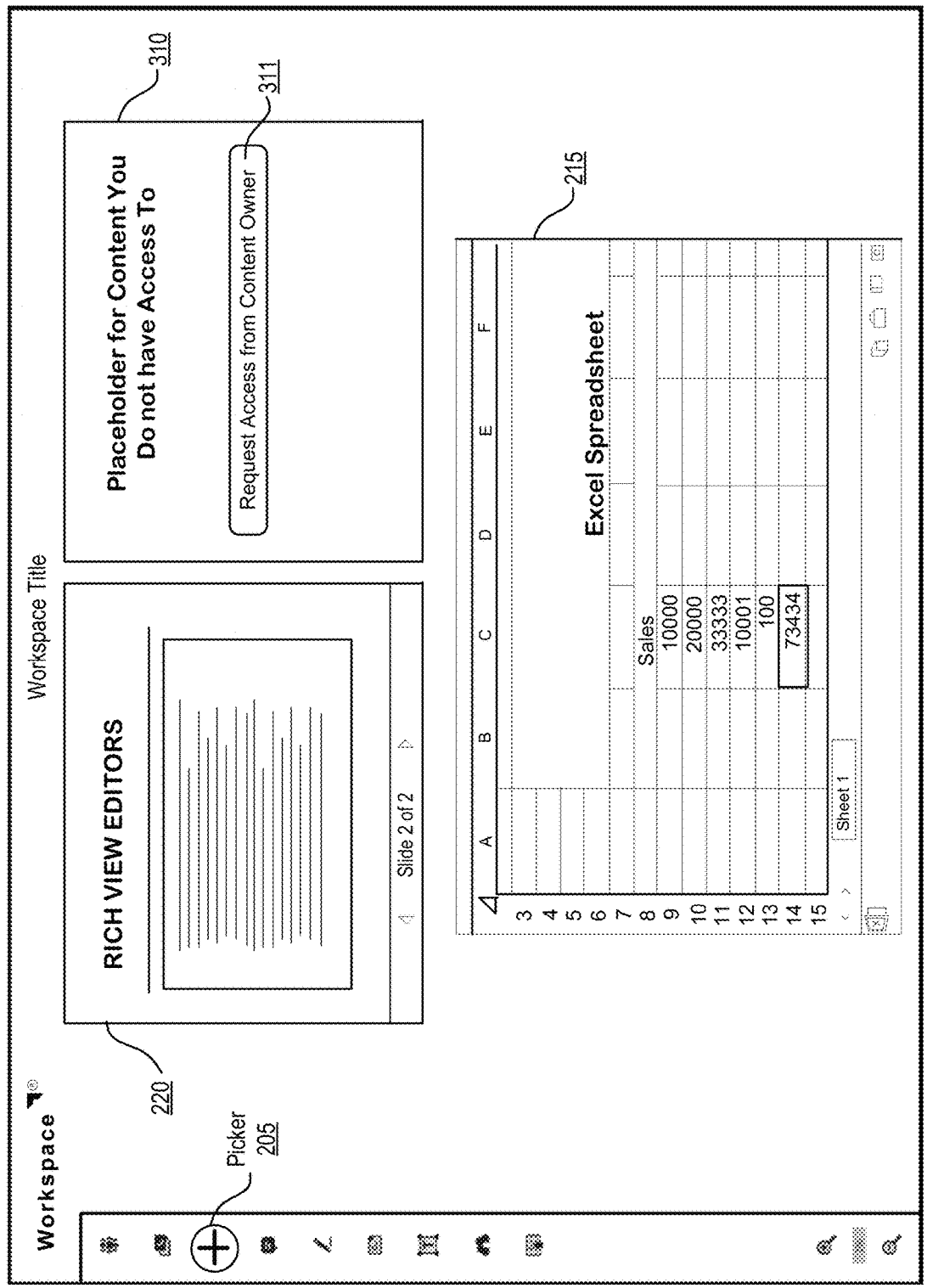
FIG. 3 presents an example of a placeholder graphical object, requiring second level authorization, displayed on a workspace.

FIG. 3 shows a rendering of the same viewport of the same workspace as shown in FIG. 2 but on different participant OID's display client. This participant OID does not have access to the MS Word™ document 210 on the top right corner of the display. The system displays a placeholder 310 in place of the MS Word™ document and presents a prompt 311 (such as a button, link or a widget) on or associated with the placeholder as show in FIG. 3. In case there is an access token available but with insufficient scope of privileges, the procedure can include first presenting a prompt in the form of graphical user interface element (e.g., 311) such as a button, pull down menu, dialog box and so on, to receive user input, for the user to login to an account at the resource server, and then the resource server via the display client can generate the prompt 311 for requesting access to content of the digital asset in order to update the scope of the access token.

After a login to the resource server, a participant display client token for the resource server can be linked to the display client, such as using a cookie. A user input selecting the prompt 311 to access content of the digital asset invokes a procedure to access the federated authorization server which maintains an authorization table for participant OIDs with resource access tokens for resource servers of digital assets in the workspace data set. If the federated authorization server finds a valid resource access token with sufficient scope for the participant OID and the resource server of the particular digital asset, then the resource access token is used in an exchange with the resource server to enable delivery of the content to the display client. If the resource access token does not carry sufficient authorization for the particular digital asset, then the resource server can execute a protocol via the display client to create and send a message to a person or persons having authority to allow access to the content of the digital asset, called a content owner account. The message can include identification of the requesting user and a name or identifier of the digital asset. The content owner can receive this message in an email, via a text message, or within the user interface of the collaboration system. In some embodiments, the email is sent by the resource server, not the workspace server.

In one example protocol, (1) if a valid long-lived token exists for the participant OID, then the asset's thumbnail will be presented. (2) If no valid long-lived token exists, then login prompt, such as a "Link to O365" button, will be presented on the placeholder. Pressing that will cause the long-lived token to be stored in authorization table, similar to the way its stored the first time user used the picker. (3) If a valid long-lived token exists, but the user doesn't have access to digital asset in resource server, then will the "request access" button is presented.

Upon obtaining authorization, the resource access token is created or updated in the federated authorization server, and the display client of the participant OID can gain access to the digital asset inside the workspace via the federated authorization server. In some cases, the display client may not have means to determine when the permission is given. In such case, the display client can provide a "Refresh" button on the placeholder. If the user refreshes and there is no valid access token in the federated authorization server yet, another "Request Permission" button is presented, selection of which will cause another email to be sent.

Also, the federated authorization server can use the resource access token, along with a pre-registered credential for the authorization server, to obtain a refresh token from the resource server, and then by refreshing the resource access token as needed, maintain long lived access to the digital asset usable, for example for multiple sessions over time under the workspace participant OID.

Figure 4:
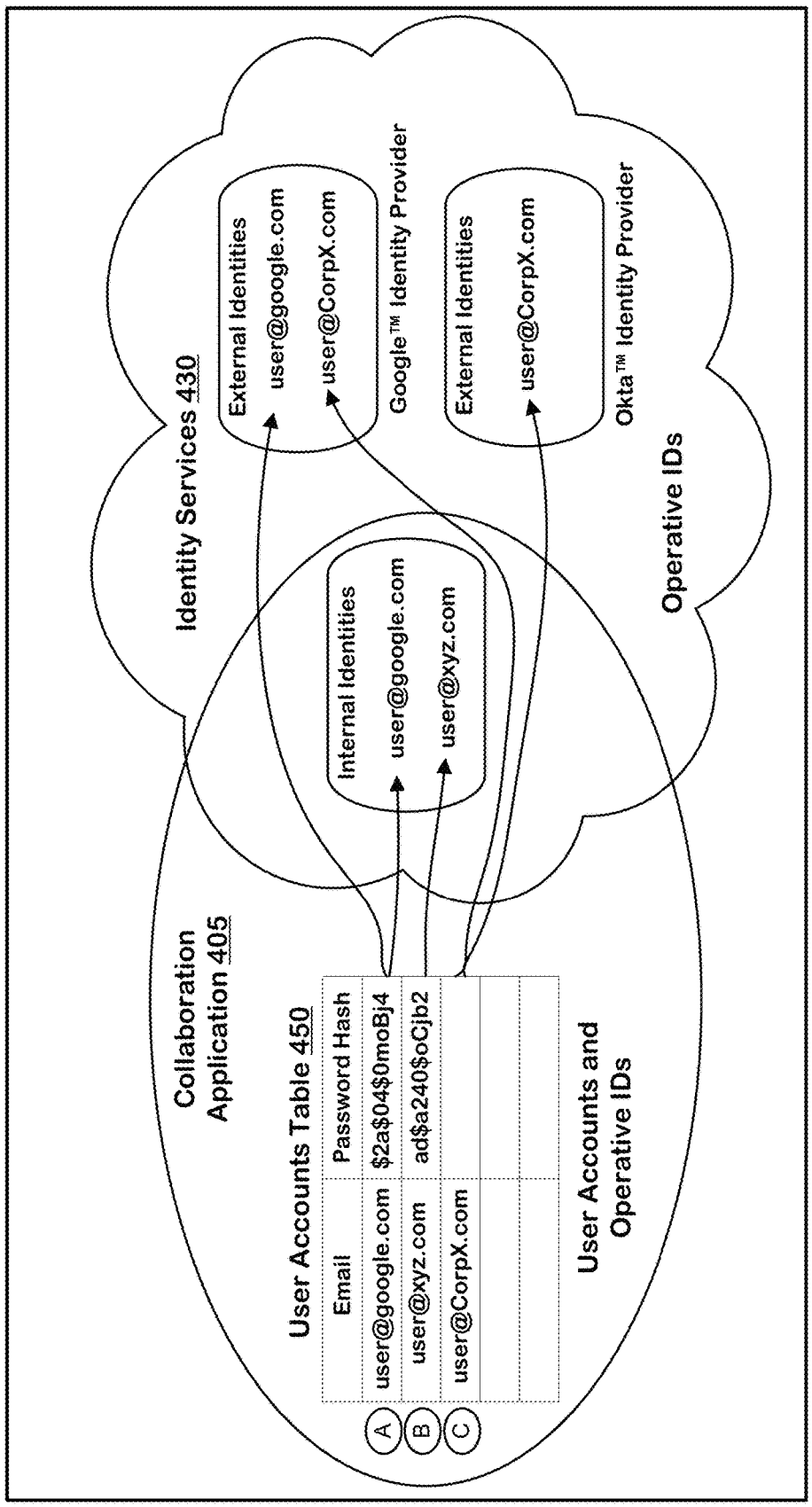
FIG. 4 presents an example of a user accounts table and operative identities of users that can used to establish the first level authorization.

FIG. 4 illustrates a user account table for a collaboration application 405 and identity services 430 usable by the user accounts, including internal identities within the collaboration system domain and external identities outside the collaboration system domain. The "user accounts" table 450 stores (such as for cases A and B) user identifiers and credential hashes required to establish a participant OID for a collaboration session. OIDs can be established using identity services including, in some embodiments, internal identities and external identities. The user can choose to set an identifier such as an email address as their account name and establish a password or other credentials. The system can store a credential hash in the "user accounts" table 450. The system can use an internal identity to establish participant OIDs linked to the display client at the client node. In the example shown in FIG. 4, the system can authenticate users A and B using their respective internal operative identities and credentials.

The users of the collaboration systems can also use a variety of third-party identity services 430 to login to collaboration service and establish participant OIDs for the collaboration workspace and internal resource servers (internal to the collaboration system), and to establish OIDs for use to access their digital content stored in cloud-based resource servers. FIG. 4 illustrates these identities as external identities. Examples of external identity services 430 include single sign-on (SSO) providers such as ADFS™, Okta™, Ping™, etc. The external identities can also be provided by cloud-based systems such as Google™, etc. for their cloud-based storage and office productivity services. One user of the collaboration system with one account in the collaboration system can have identities in more than one third-party identity providers. For example, user A in FIG. 4 has an internal identity and an external identity. User C has two external identities in two separate identity providers.

Referring to FIG. 4, the account "user@google.com" (labeled as A) has two operative identities. The first operative identity is an internal identity, hosted by the collaboration service's identity provider and storing a password hash in the user account table, and the second operative identity is an external identity, hosted by an external identity provider, such as a Google™ cloud-based system, which maintains credentials outside the user accounts table 450.

The account "user@xyz.xom" (case B) in FIG. 4, has one internal operative identity hosted by collaboration service's identity provider, storing a password hash in the user account table.

The account "user@CorpX.com" (labeled as C) in FIG. 4, has two external operative identities hosted by external identity providers. So there is no password hash in the user accounts table for this user account. The first external operative identity is hosted for example, by Google™, and the second external operative identity is hosted by another service, such as Okta™.

External Resource Server

The digital assets can be stored on a cloud-based storage and accessed via an external resource server. For example, Google™ Drive can host digital assets (also referred to as external resources) such as Google™ docs and Google™ sheets. For resource permissions, external resource servers can use their own accounts, such as an account in Google™ Drive. The collaboration system can register with a registration server using for example an application registration tool like Azure App Registration, that provides means including a pre-registered credential for the federated authorization server to access resources in an external resource server associated with the external resource, and be granted authorization levels by external resource server sufficient to act as a federated authorization server. The collaboration system saves information provided by the registration server, such as the server's URL for accessing its protected resources and a resource server-provided OAuth client secret for establishing authorization tokens for resource access.

Figure 5A:
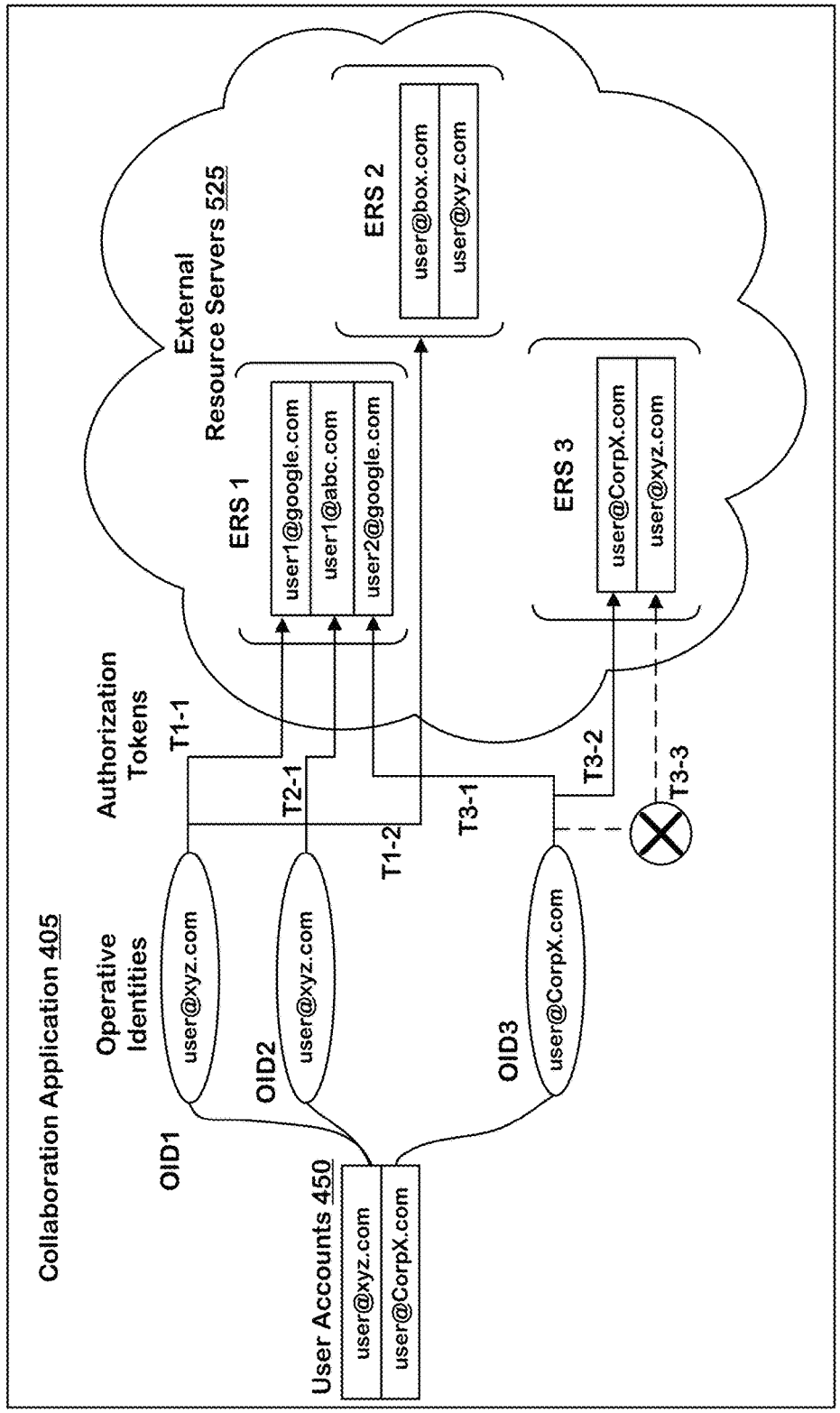
FIGS. 5A and 5B present examples of establishing the second level authorization to replace a placeholder graphical object with a content-revealing graphical object.
Figure 5B:
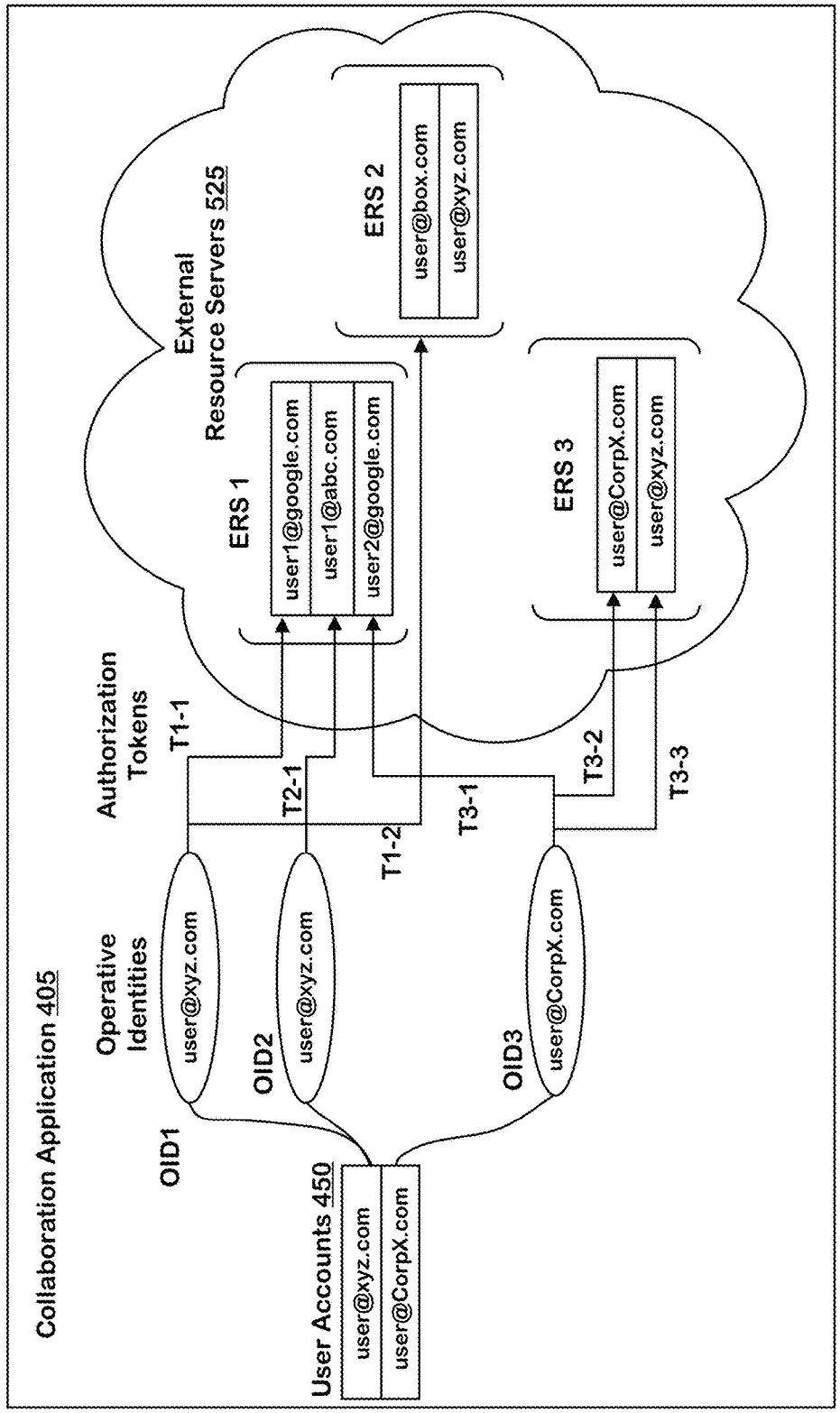

FIGS. 5A and 5B illustrate two approaches by which owner accounts can share digital assets with participant OIDs to avoid data privacy breach. In the first approach, one owner account is allowed to approve only one authorization request for a particular external storage server. This approach is presented in FIG. 5A. In a second approach, one owner account can approve more than one authorization requests to a particular external storage server. This approach is presented in FIG. 5B.

FIG. 5A presents a first approach in which an owner account can have at most one access token per external storage server. FIG. 5A presents a user accounts table 450 listing two example user accounts. There are three external resource servers 525, ERS1, ERS2, and ERS3 storing digital assets. A first account user@xyz.com has one operative identity OID1, linking the workspace user account (user@xyz.com) via one identity provider to two resource server accounts (user1@google.com at ERS1 and user@box.com at ERS2). OID1 (acting via an owner account at the resource server) can place digital assets from ERS1 and ERS2 in a workspace. Thus, OID1 authenticates/authorizes with both ERS1 and ERS2 resulting in tokens T1-1 and T1-2 stored at the federated authorization server for OID1. The user @xyz.com workspace user account has a second operative OID2 via a second identity provider linking the workspace user account to a different account (user1@abc.com) in the ERS1, which can (acting as an owner account) place a digital asset from ERS1 in a workspace, resulting in one token T2-1 stored at the federated authorization server for OID2.

The account user@CorpX.com has a single operative identity OID3 linking the workspace user account (user@CorpX.com) via a identity provider to an account (user2@google.com) for ERS1. The OID3 (acting as participant OID) requests to view the document in ERS1 that OID1 (acting as owner account) placed into the workspace, but needs ERS1 permissions to view it. In ERS1, the account user1@google.com will be required to share the document with account user2@google.com to enable OID3 to access content of the document. When permission is granted, the token T3-1 will have sufficient scope to be usable to access contents of the document (i.e., for ERS1 to deliver the content to the display client linked to OID3).

Operative identity OID3 (acting as an owner account) may also places a digital asset from ERS3 in a workspace. The digital asset is stored in ERS3 so a token T3-2 is established.

As a security measure, the federated authorization server may enforce conditions for addition of protected assets to the workspace. For example, OID3 may be prevented from adding a second digital asset stored in ERS3 to the workspace, as labeled by a cross sign on token T3-3 as shown in FIG. 5A, using a condition limiting an OID to adding only one digital asset to a workspace from a given external resource. The owner account OI3 already has a token T3-2 for ERS3 and thus a second token (T3-3 represented by a broken line) to the same external storage server is not allowed. The federated authorization server can include logic to block creation of a resource access token for more than one digital asset in a single external resource server in order to limit distribution of digital assets via a workspace.

FIG. 5B presents a second approach in which the technology disclosed allows a given OID to have more than one token in the identity provider for an external resource server. In such an embodiment, more responsibility is placed on the participant OID to decide which operative identity to use in a given workspace. The federated authorization server can include logic to allow creation of an access token for more than one digital asset in a single external resource server in order to support broader distribution of digital assets via a workspace.

Referring to example in FIG. 5B, the owner account OID3, in this approach, is allowed to have two tokens T3-2 and T3-3 to ERS3, one for user@CorpX.com external resource account, and one for user@xyz.com external resource account. In such an embodiment, to maintain data privacy, the technology disclosed can include additional data in an external resource link to digital assets stored in the external resource server so that the external resource link allows the participant OIDs to access appropriate digital asset with a given token. For example, the external resource link (or ERLink) can identify the digital asset to access when there are multiple tokens for an owner account to the same external resource server, rather than just the external resource account. Further details are presented in discussion of ERLink with reference to FIG. 7.

In another example, the OID3 may be able to have multiple tokens, including different tokens for different groups of workspace accounts, such as workspace accounts from different agencies or divisions of a business entity utilizing the workspace. For example, OID1 may have O365 accounts in two separate Azure tenants—each representing two different business entities in a corporation, or two different government agencies may have different external resource accounts. To enable this (remove the X of FIG. 5A), an extra field, such as "issuerID" can be added to the ERLink, and used as a part of the primary key in the federated authorization table as a condition for creating multiple resource access tokens under one OID. This would allow having multiple tokens for a given OID, but still only a single token for each group of workspace accounts.

FIG. 6 presents an example authorization table 610 which can be stored in an authorization server in or accessible by the collaboration system. The first field (labeled 'USER ACCT') and second field (labeled 'IDSP') in the table, store the user account record identifier and the identity provider identifier, respectively, for a participant OID for the workspace. For example, a value of "1" in the SPID field can indicate that OID1 utilizes an internal identity provider managed by the collaboration application. A value other than "1" (such as 2, 3, 4, . . . ) can indicate that OID1 utilizes an external identity provider.

The third field (labeled 'ersType') is the external resource type (ERS_TYPE) identifier indicating the type of resource e.g., Google™ Drive, OneDrive™, Box™, etc. For example, the records 615 and 620 indicate the external resource server is "o365" (Office 365). When the digital asset is a "canvas" object as discussed above, the collaboration application is the (virtual) external resource server. For example, for the record 625 in the authorization table 610, the ersType is "cApp" (collaboration application).

The fourth field (labeled 'ersScope') is accessScope (ERS_SCOPE) which indicates access restrictions such as read only, read/write, etc. In one embodiment, the authorization table 610 does not include "ersScope" field. In such some implementations, the scope can be embedded, instead or also, in the resource access and refresh tokens and a new resource access token is generated when the scope needs to be broadened or narrowed. The fifth field (labeled 'accessToken') stores the access token.

The sixth field (labeled 'refreshToken') stores the refresh token. The refresh token can have a longer validity time or may never expire.

The seventh field (labeled 'accessTokenExp') includes time durations for access token. For the example records 615, 620, and 625, the access token expiry is set at 3599 seconds (or 1 hour) as shown in the authorization table. Other values of access token expiry time can be set, typically by the resource server, greater than or less than 1 hour. When a user changes her login credentials to an external resource server such as by changing the password, a new access token may be needed from the external resource server and updated in the authorization table. The access tokens can have a shorter validity period such as from one hour to a few weeks. Many external resource servers also issue a refresh token along with access token when a user authenticates.

The duration of the refresh token is stored in the eighth field (labeled 'refresh TokenExp'). For the three example records 615, 620, and 625, the values for refresh token expiry are "NULL" indicating the there is no expiry time limit for the refresh token. The resource server, or the federated authorization server, may set conditions, such as time limits, or limits associated with particular workspace data sets or groups of workspace accounts, for expiry, or invalidation, of the refresh token. When the access token has expired the external storage service can execute an authorization protocol using the refresh token, in response to which a new access token is provided, and the new access token is added to the access table. Thus, providing a long-lived access authorization status for the corresponding participant OID to a digital asset, even for access to digital assets controlled by a different owner external resource account.

The ninth field (labeled 'accessTokenCreatedAt') and tenth field (labeled 'refresh TokenCreatedAt') contain creation dates for access and refresh tokens, respectively.

Authorization table can include a unique row of access tokens for a primary key that identifies the participant OID, the resource server for a digital asset and the scope of permission granted, which in this example comprises four values: OID1, OID2, ERS_TYPE, ERS_SCOPE, so that there is a unique record in the authorization server for each external resource having a given level of permissions for a given participant OID requiring second level authorization for access to digital assets at that permission level in the external resource. In another embodiment, the primary key can also include an identifier of the digital asset such as external resource link information (see, e.g. FIG. 7), or other parameters such as an access group identifier, so that there is a unique record in the authorization server for each digital asset requiring second level authorization for a given participant OID for access to the digital asset.

FIG. 6 shows an example of authorization table with the above listed fields. However, it is understood that additional fields may be added to the authorization table. Also, to implement group level access, a field including an access group identifier where an access group is a participant OIDs or a group of resource server accounts (such as a "tenantID"), can be included. Also, to implement time-limited or time-bound access to digital assets, the authorization table can include a "validity duration" field. Also, the authorization table can include a digital asset identifier field. The system can include logic to use the time duration (such as 30 min, 1 hour, 24 hours, 1 week, etc.) in the validity duration field along with creation times of access and refresh tokens to provide time-bound access to digital assets to participant OIDs. In some embodiments, the access token can be deleted from the table, or marked invalid, when a collaboration session in which the digital asset is enabled by an authorized participant OID is closed, or when a password of the participant OID or of the resource owner account is changed. The access to a digital asset can be revoked when the participant OID has accessed the digital asset up to the time limit of the duration. The authorization table can be stored in a persistent storage such as the OAuth storage database 808 and accessed by the federated authorization storage service.

FIG. 7 presents an example external resource link ERLink 705. A workspace data set in embodiments described herein includes event including a location in the workspace and a link to a digital asset, which can be an ERLink. The ERLink includes an external resource server identifier or ERS-specific information to identify the linked digital asset as well as metadata about an owner account of the resource. In one example as shown in FIG. 7, the ERLink contains 'owner accountMetadata' information such as email and identifier of location in a data storage server (such as cloud-based data store) identifying the principal which created the link. It can also contain an 'ersType' field identifying a type of external resource server, and an 'ersScope' field identifying types of access authorized, which are presented above in authorization table described with reference to FIG. 6.

The ERLink can also contain external resource information labeled as 'ersInfo' which can further include the name of the external resource such as the file name, the type of the external resource such as file type and the link to the external resource. Finally, the ERLink can contain information about the creator of the ERLink, or owner account of the external resource such as the user account identifier (e.g., email address).

In the embodiment, in which one operative identity can have plural access tokens to single resource server (as shown in FIG. 5B), additional data in the external resource link can be included. Such additional data can identify a group of workspace accounts, such as for a division or agency of a corporations or governmental entity, the specific digital assets, or other parameters usable to control selection of the entry in the authorization table (e.g. included in a primary key).

Process for Second Level Authorization

A procedure is provided that can add a digital asset to the workspace for which a second level authorization is required to give access to a digital asset stored or controlled by a resource server to a display client linked to a requesting participant OID in a collaboration session. The authorization procedure can be used to allow users of the collaboration system to access resources stored on external resource servers (or cloud-based storage systems). Also, the authorization process can be used to authorize digital assets stored on a local resource server or other protected storage such as in a network client or another on-premise storage. The process includes three high-level parts.

Process Part 1: Obtain ERLink(s) Information Using Picker and Create Collaboration Link Event(s)

The first part is performed by a first client-side node after first level authorization, to add a digital asset requiring second level authorization to a workspace. The user at a client node including the display client executes an authorization flow with the external resource server storing the digital asset, to establish an owner account, specifies a scope for resource access. The participant may first login to the resource server for the digital asset. In some embodiments, a successful login and authorization, includes delivery of a cookie to the display client including a client access token to be used by the display client in communication with the resource server. To add digital assets, the display client displays a "picker" which can be driven by the resource server in a window on the workspace interface to select the digital assets for adding to the workspace. The access scope defining levels of authorization for access to the digital asset can be set in the picker dialog, using for example an authorization popup rendered after the participant at the display client is authenticated. The narrowest scope is a read-only scope. A broader scope such as read-write can also be set. The collaboration server can create an external resource link (ERLink) for the digital asset included in the workspace by using the picker. If the user wants to set a different access scope (narrower or broader scope) in the ERLink than the access scope set in the external resource server, additional re-authorization step may be required.

1. Display client performs OAuth authorization flow with the resource server authorization server to allow picker 205 to choose files. This may or may not bring up sign-in/authorization screens, depending on if the display client has already been authorized for the given scope.
2. Display client displays a resource picker 205. The resource picker is a procedure launched by user input, such as by selecting a user interface element such as a button, widget or a link displayed on the display client.
3. The picker procedure identifies digital assets in the resource server selected by the user to be added to the workspace data set.
4. The picker procedure at the client-side node prepares ERLink information (See, FIG. 7) to be used to create link events in workspace data set (e.g., spatial event map). The ERLink includes information for an authorization table entry, including the resource owner account metadata, the OAuth scope for selection, and the "linkInfo" for each selected resource. The linkInfo format can vary (for example, it may be a URL or an identifier) based on the external resource server or ERS type.
5. The ERlink events are added to the collaboration, by for example adding an event to the workspace data set (e.g., a spatial event map) identifying a graphical object like a window, such as can be controlled using an inline frame (iframe), a location in the workspace coordinates and the ERLink to the resource server. A ERlink event can be added to the workspace data set by sending individual ERLink event objects via a web-socket or other communication channel to the network nodes participating in the collaboration session, and to the collaboration database on server-side nodes, which stores the collaboration data set. In some embodiments, a batch of events can be added by sending an ERLink-Set object objects via a web-socket or other communication channel to the network nodes participating in the collaboration session, and to the collaboration database on a server-side node or nodes.

Process Part 2: Save OAuth Token Information to OAuth Storage

Figure 8:
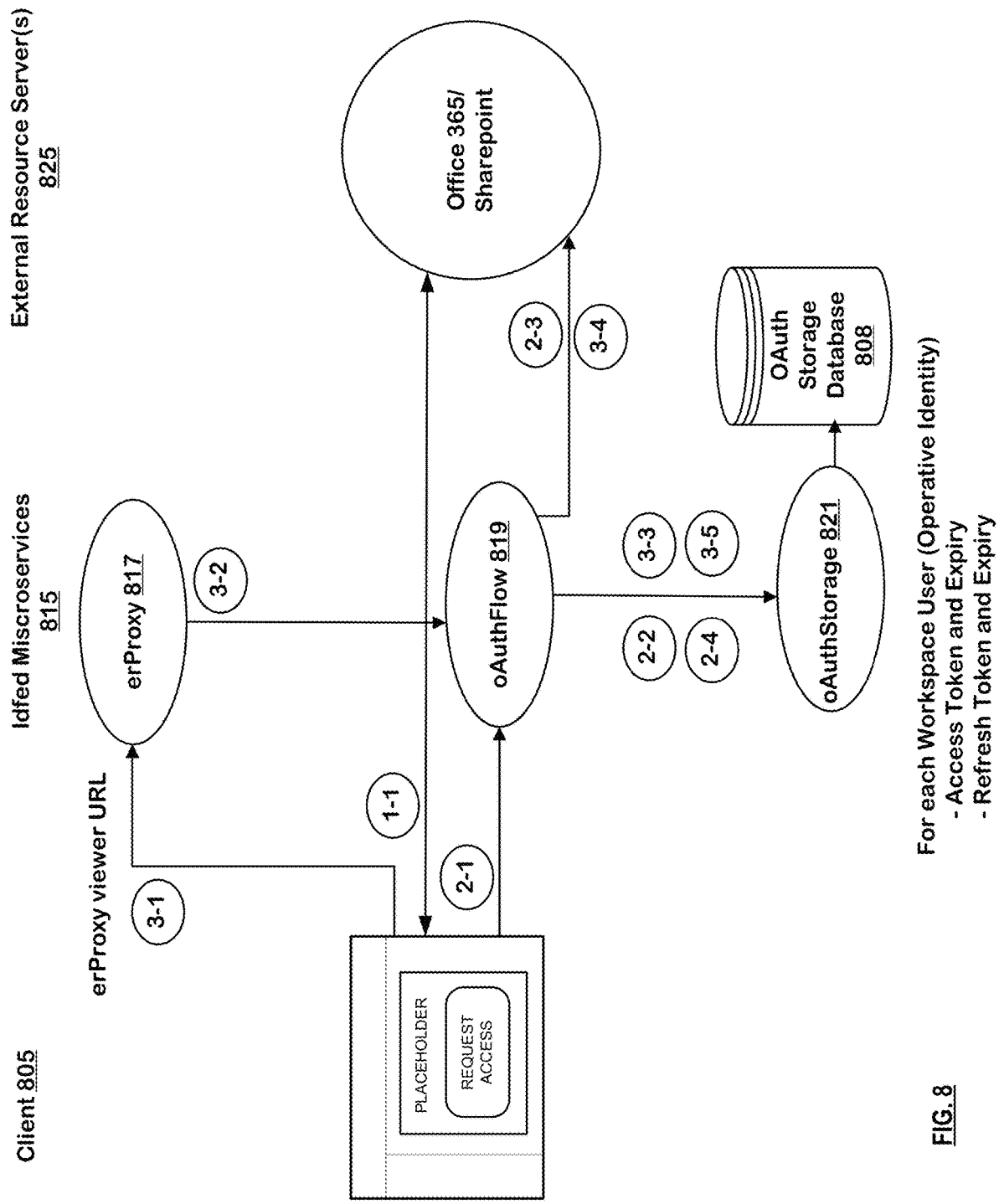
FIG. 8 presents an example interaction diagram illustrating communication between a client, server and an external resource server.

The second process step describes the storage of resource access tokens in the authorization table of the federated authorization server. The resource access tokens can be OAuth tokens. See, RFC 6749, The OAuth 2.0 Authorization Framework, IETF, October 2012. OAuth tokens (access token and refresh token) can be saved to authorization table in an OAuth storage database in order to provide view and/or edit access to the external resources in the workspace. The key for the token table can be made up of operative identity, ERS type, and OAuth scope. Further details of this process step are presented below in discussion of interaction diagram (FIG. 8).

Process Part 3: Show a Resource Viewer in the Workspace

A workspace data set can contain view links and/or edit links to various external resources from various external resource servers. When a user opens a viewport, the client parses the workspace data set of objects located within the viewport. If an ERlink event is found, the event provides a URL identifying the digital asset to the federated authorization server. If a valid resource access token for the participant OID is found, or established by use of a refresh token, then a content revealing object such as thumbnail can be delivered to the display client, and if the thumbnail is selected at the display client, a web-native view can be delivered in which control of interaction with the content, including editing and annotating, can be managed by the external resource server. If a valid resource access token is not found, or does not have sufficient permissions for the participant OID, then a placeholder can be displayed. When authorization is established, the location on the screen of placeholder can be replaced by a content revealing object, such as a thumbnail, or web-native view.

Interaction Diagram for Second Level Authorization

The interaction diagram in FIG. 8 illustrates operations of a federated authorization server implemented for example using Idfed microservices 815, involving a display client 805 and one or more resource servers 825, which can be external and internal resource servers. Resource servers can include or be linked with authorization servers which control authorization levels for owner accounts access to digital assets in the resource server control.

Interaction 1: Obtain ERLink Using Picker and Create Spatial Event Map Link Events Step 1-1: To add a digital asset from a resource server, the client 805 executes a login protocol for the resource server. This can include performing a resource server OAuth authorization protocol needed to enable an owner account. Upon authentication and authorization with the resource server, the client can receive a display client access token linked to the display client using for example a cookie, used to enable a picker to select digital assets for the display client. Also, the display client can display the file picker on the user interface of the display client. With the client access token in the cookie, asset can use the picker to select the digital asset in an external resource server 825 for which it has appropriate authorization level. For example, in FIG. 8, the user selects a digital asset from Office 365/Sharepoint external resource server, and its authorization server. The client workspace application detects the selection and adds an external resource link to the workspace data set in response to the selection action from the digital asset owner account and generates an external resource link ERLink. The external resource link can include information for a "create link event" having a location in the workspace, in the spatial event map. A thumbnail or other content revealing object can be delivered to the display client linked to the participant OID by the client access token.

Interaction 2: Save OAuth Token Information to OAuth Storage

In the second interaction an ID federation system (Idfed microservices 815) interacts with the external resource server to store authorization tokens (including access and refresh tokens) to authorization table in OAuth storage database 808. The authorization tokens can then be used to establish second level authorization to access the digital asset using participant OIDs. The Idfed microservices 815 can comprise an erProxy service 817, an OAuthFlow service 819, and an OAuthStorage service 821.

Step 2-1: The display client running on the client-side node forms an HTTP GET request to the OAuth Flow service's API "/acquireAndSaveLongLivedTokenInfo" endpoint and in one embodiment assigns it to a hidden iframe, or in another embodiment in a temporary popup. The reason to use hidden iframe is to avoid display of additional popup messages during this process as these are directed to the hidden iframe and thus not visible on the display client.

Step 2-2: When the display client wants to display the external resource thumbnail or its view/edit user interface, the OauthFlow service 819 determines if an authorization token (e.g., access/refresh token) exists for the external resource server principal (user) in the authorization storage database 808. The OAuthFlow service 819 sends a message to oAuthStorage service 821 which can access the database 808 for access to the authorization tables for each participant OID.

Step 2-3: If access/refresh tokens are not available or have been revoked, the OAuthFlow service can enter an interaction with the external resource server to obtain access/refresh tokens. This can include a message to the display client with a redirect to the resource server, so the display client provides a token establishing its authorization to access the resource server. The oAuthFlow service receives access/refresh tokens from the external resource server. This can be implemented using a redirect message to the display client at the client, which redirects the tokens to the Federated Authorization server (oAuthFlow in Microservices 815).

Step 2-4: The OAuthStorage service can store the access/refresh tokens in the authorization table in OAuth storage database 808.

Interaction 3: Show a Resource Viewer in the Workspace (Replacing the Placeholder)

In the third interaction, the steps to display content of the digital asset on the client after establishing second level authorization are presented.

Step 3-1: The client forms an erProxy viewer URL and forwards it to the erProxy service 817 using the ERLink information from the link event created in step 1-1 above. If the client-side node is using a browser to display the contents of the digital asset, then a web-client assigns the URL to an iframe. If the client-side node is using a large format display wall then a wall-client assigns the link to the resource viewer on the wall. When the erProxy viewer URL is fetched (via HTTP GET from the iframe), the erProxy will return a redirect to a web native viewer that allows, for example, digital assets such as Excel™ or Power Point™ to run interactively inside the iframe. In some embodiments, the URL and error code can be optionally returned instead of an HTTP redirect to the URL. The erProxy service 817 requires a valid OAuth access token in order to create the redirect URL.

Step 3-2: The erProxy service 817 sends a request to OAuthFlow service 819 for a valid access token.

Step 3-3: The oAuthFlow service 819 requests the OAuth token information from oAuthStorage service 821. The oAuthStorage service returns a valid access token. If the oAuthStorage does not have token information for the user or the access token has expired, the client can initiate user authentication process and request the user to enter login credentials for external resource server. The access token can expire or become invalid for various reasons. For example, a new access token can be required if the user has changed login credentials to the external storage server such as by setting a new password.

Step 3-4: The oAuthFlow service enters a token refresh interaction with the external resource server using the access token from step 3-3. This can be invoked when the current access token is expired, and an access is requested, or it can be invoked periodically based on elapsed time.

Step 3-5: When the token refresh interaction has succeeded, the oAuthFlow stores the new access token and its new expiry to OAuthStorage database 808. The oAuthFlow service creates the redirect URL using the access token and resource location information from the original erProxy viewer URL, and sends it to the resource server, which returns it to the display client. Then, the web native viewer appears in the client's iframe, where content of the digital asset is revealed.

Canvas Object

In one embodiment, the workspace can include a canvas object defining a region in the workspace. The workspace data set can include entries for digital assets having locations within the region defined by the canvas object. The system includes logic to render a placeholder canvas graphical object and a canvas access prompt for requesting access to digital assets in the region defined by the canvas object. The system includes logic to detect user input indicating selection of the canvas access prompt, and in response executing a protocol to establish a canvas second level authorization at the display client. Upon establishment of the canvas second level authorization, the system includes logic to replace the placeholder canvas graphical object with graphical objects revealing content of the digital assets having locations within the region defined by the canvas object.

Consider a collaboration scenario in which users from multiple organizations or departments are participating. Different organizations may not want to share their content with other organizations. The technology disclosed can enable collaboration amongst participant OIDs from multiple organizations. There may be hundreds of digital assets and tens or possibly hundreds of participant OIDs from different organizations. Establishing second level authorization for such large number of digital assets and participant OIDs can consume considerable amount of time. The technology disclosed provides a canvas object to facilitate second level authorization such scenarios.

Canvas is a two-dimensional area in the workspace. A guest participant OID or an outside consultant invited to a collaboration session can be given access to the canvas object for a predefined amount of time such as one hour or one day to attend the collaboration session. The use of canvas object allows the technology disclosed to bring information from different folders, including charts, documents, videos, etc. in the canvas and share with participant OIDs who may not have authorization to access such content.

The technology disclosed can provide "canvas level permission" model to implement the second level authorization for revealing content of digital assets positioned in a canvas object. In this case the canvas object can be considered as the external resource and the collaboration application is the resource server controlling access to the digital assets in the canvas object. When second level authorization is established for a canvas object for a requesting participant OID, the requesting participant OID automatically gets access to all digital assets (or content) positioned inside the boundaries of canvas object.

In the case of canvas object, the second level authorization is performed for the canvas object and the access tokens for the digital assets within the boundary of the canvas object are stored in the authorization table per operative identity as explained above. In this case, the owner account identifies the party controlling access to digital assets in a canvas object in the workspace. An entry in the workspace data set is included identifying that the canvas object requires a second level authorization. The canvas object is displayed as a placeholder graphical object on workspace of another display client for which second level authorization is not yet established. When user input is detected on canvas access prompt, an authorization request message is sent to the authorization server. The owner account of the canvas object can approve the authorization request resulting in creation of an access record in authorization table 610. In this case the canvas object can be considered as "external resource" and the collaboration application can be considered as the resource server. This information is stored along with identifiers for tokens in the authorization table.

When the second level authorization is established for the canvas object, the placeholder canvas graphical object is replaced with graphical objects revealing content of digital assets having locations within the region defined by the canvas object. Therefore, when the canvas object is used, the display client does not need to send authorization requests for digital assets positioned in the canvas object. Rather the server automatically performs second level authorization for any digital assets positioned inside the canvas object requiring second level authorization. Therefore, the requesting participant OID has to get second level authorization once for the canvas object and no further authorization requests are needed for digital assets (or content) positioned inside the canvas object. The owner account can dynamically add digital assets in a canvas object during a collaboration session. The authorization process is performed in the background and digital assets are displayed using content revealing graphical objects. Access records for digital assets are added in the authorization table.

In some embodiments, individual digital assets in the canvas object may require an additional second level authorization, and placeholder objects may be displayed for the individual digital assets after authorization to access the canvas object is achieved.

Canvas object can be considered as a parent object and other graphical objects inside the canvas can be considered as child objects of the canvas, thus representing a nested arrangement. When the owner account of the canvas object moves a child object outside of the boundaries of canvas, the authorization for the child object can be revoked and the content revealing child object can be replaced by a placeholder graphical object on display clients of other participant OIDs. The authorization table can be updated accordingly by removing the access records for these digital assets or marking the access tokens as expired.

Process Flowcharts

Figure 9:
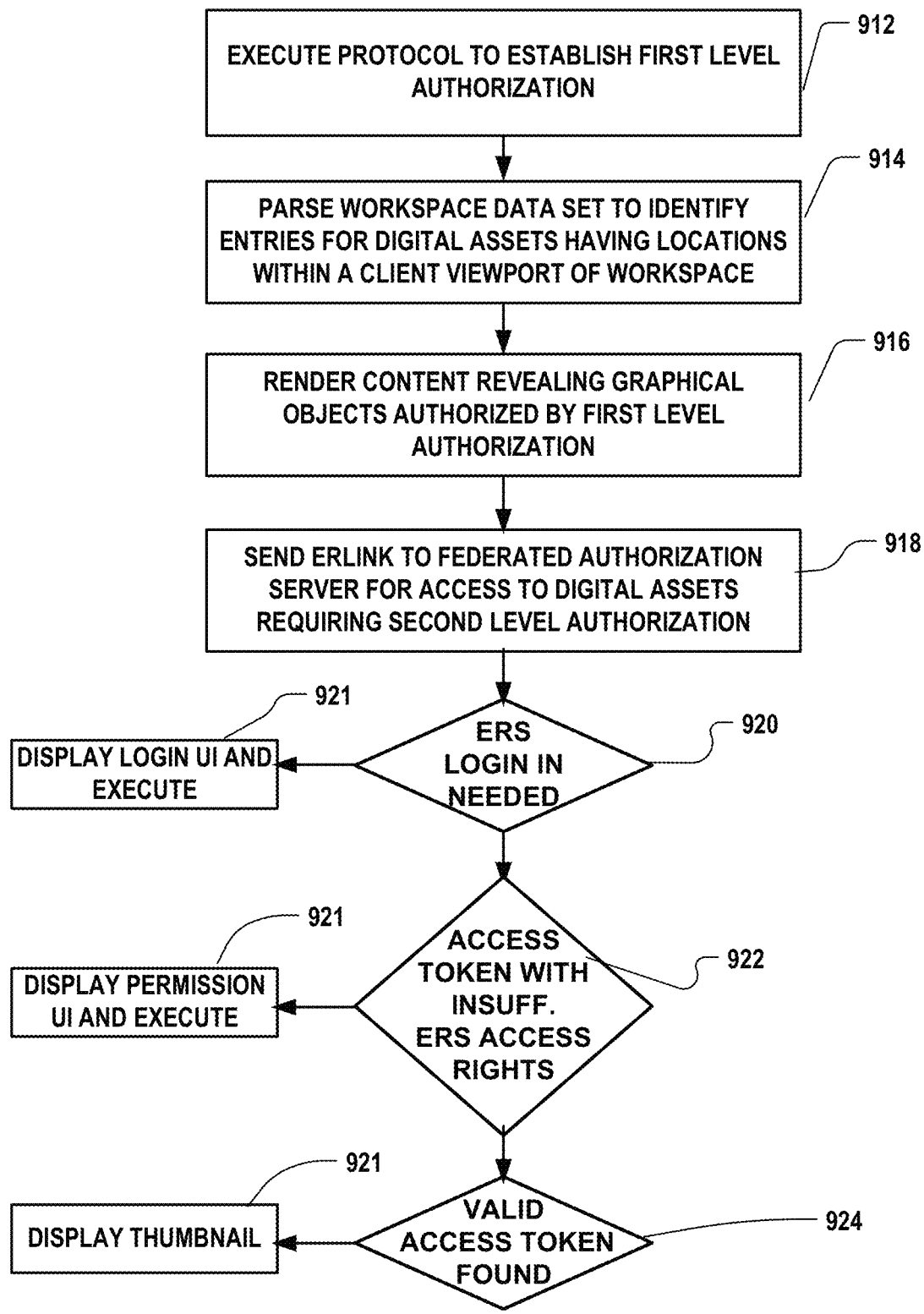
FIG. 9 is a flowchart presenting process steps performed at the client-side network node to establish second level authorization for placeholder graphical objects.

FIG. 9 presents a process flowchart for controlling display of a workspace. The flowcharts illustrate logic executed by the server, clients, or both. The logic can be implemented using processors programmed using computer programs stored in memory accessible to the computer systems and executable by the processors, by dedicated logic hardware, including field programmable integrated circuits, and by combinations of dedicated logic hardware and computer programs. As with all flowcharts herein, it will be appreciated that many of the steps can be combined, performed in parallel or performed in a different sequence without affecting the functions achieved. In some cases, as the reader will appreciate, a re-arrangement of steps will achieve the same results only if certain other changes are made as well. In other cases, as the reader will appreciate, a re-arrangement of steps will achieve the same results only if certain conditions are satisfied. Furthermore, it will be appreciated that the flow charts herein show only steps that are pertinent to an understanding of the technology, and it will be understood that numerous additional steps for accomplishing other functions can be performed before, after and between those shown.

Client-Side Process

FIG. 9 is a flowchart presenting client-side process steps for controlling display of a workspace. The process starts at a step 912 at which a protocol is executed to establish a first level authorization at a display client on a network node, enabling access to a workspace data set. This can include a login using a participant OID, and delivery of a workspace access token to the display client usable to access a workspace data set. The workspace data set can have a plurality of entries. The entries in the plurality of entries can identify respective digital assets and locations in the workspace for graphical objects representing the respective digital assets. The plurality of entries can include a particular entry identifying a particular digital asset requiring a second level authorization, or many such entries.

At a step 914 the display client parses the workspace data set to identify entries for digital assets having locations within a client viewport region of the workspace.

At a step 916, the display client can render graphical objects on a display representing the identified digital assets within the client viewport region authorized by the first level authorization.

At step 918, the display client sends ERLinks to the federated authorization server for access to the particular digital asset requiring second level authorization. The display client can invoke the erProxy 817 to seek access to the particular digital asset, which returns a result to the display client.

The result can indicate that an ERS login is required for the display client linked to the participant OID (920), for example when the virtual long-lived token is missing or has been revoked by ERS. The process here is actually to acquire and save a new access token so the process can require authorization in addition to just authentication (login). If yes, then the display client displays placeholder with a prompt for a login user interface (921) and after login returns to step 918. If not, then the result can indicate that a resource access token is established for the participant OID, but does not have sufficient ERS access rights (or "scope") for the particular digital asset (922). If yes, then the display client renders placeholder with a UI to request permission (923) and returns to step 918. If not, the result can indicate a valid token and the display client renders a thumbnail or other content revealing object. Of course, there can be many entries requiring second level authorization.

Workspace Data Structures

FIGS. 10A-10G represent data structures which can be part of workspace data maintained by a database at the collaboration server 107. In FIG. 10A, an event data structure is illustrated. An event is an interaction with the workspace that can result in a change in workspace data. An event can include an event identifier, an approval identifier, a user identifier, a timestamp, a session identifier, an event type parameter, the client identifier, and an array of locations in the workspace, which can include one or more locations for the corresponding event. It is desirable for example that the timestamp have resolution on the order of milliseconds or even finer resolution, in order to minimize the possibility of race conditions for competing events affecting a single object. Also, the event data structure can include a UI target, which identifies an object in the workspace data to which a stroke on a touchscreen at a client display is linked. Events can include authorization request events when a participant OID interacts with a graphical object with a second level authorization. Events can also include approval events that indicate approval from the owner account of the content to the requesting participant OID to access the content or digital asset. Events can include style events, which indicate the display parameters of a stroke for example. The events can include a text type event, which indicates entry, modification or movement in the workspace of a text object. The events can include a card type event, which indicates the creation, modification or movement in the workspace of a card type object. The events can include a stroke type event which identifies a location array for the stroke, and display parameters for the stroke, such as colors and line widths for example.

Events can be classified as persistent, history events and as ephemeral events. Processing of the events for addition to workspace data, and sharing among users can be dependent on the classification of the event. This classification can be inherent in the event type parameter, or an additional flag or field can be used in the event data structure to indicate the classification.

A spatial event map can include a log of events having entries for history events, where each entry comprises a structure such as illustrated in FIG. 10A. The server-side network node includes logic to receive messages carrying ephemeral and history events from client-side network nodes, and to send the ephemeral events to other client-side network nodes without adding corresponding entries in the log, and to send history events to the other client-side network nodes while adding corresponding entries to the log.

FIG. 10B presents an approvals data structure. The approvals data structure can provide attributes that identify an authorization from owner account of a content or digital asset to a requesting participant OID to access the content. The approvals data structure can contain an approval identifier and an access record identifier. The access record identifier can identify an entry in the access records data structure that contains access tokens and other data related to the approval.

FIG. 10C presents an access records data structure. The access records data structure can include information related to an approval from content owner account to a requesting participant OID to access the content. The access records data structure can contain an access record identifier, an access token, a storage server identifier, a digital asset identifier, a requesting user identifier and an access scope. Fewer or more data elements can be included in access record data structure such as a time limit indicating a time bound approval from the content owner account to access the requested digital asset.

FIG. 10D illustrates a card data structure. The card data structure can provide a cache of attributes that identify current state information for an object in the workspace data, including a session identifier, a card type identifier, an array identifier, the client identifier, dimensions of the cards, type of file associated with the card, and a session location within the workspace.

FIG. 10E illustrates a data structure which consolidates a number of events and objects into a catchable set called a chunk. The data structure includes a session ID, and identifier of the events included in the chunk, and a timestamp at which the chunk was created.

FIG. 10F illustrates the data structure for links to a user participating in a session in a chosen workspace. This data structure can include a session access token, the client identifier for the session display client, the user identifier linked to the display client, a parameter indicating the last time that a user accessed a session, and expiration time and a cookie for carrying various information about the session. This information can, for example, maintain a current location within the workspace for a user, which can be used each time that a user logs in to determine the workspace data to display at a display client to which the login is associated. A user session can also be linked to a meeting. One or more than one user can participate in a meeting. A user session data structure can identify the meeting in which a user participated in during a given collaboration session. Linking a user session to a meeting enables the technology disclosed to determine the identification of the users and the number of users who participated in the meeting.

FIG. 10G illustrates a display array data structure which can be used in association with large-format displays that are implemented by federated displays, each having a display client. The display clients in such federated displays cooperate to act as a single display. The workspace data can maintain the display array data structure which identifies the array of displays by an array ID, and identifies the session position of each display. Each session position can include an x-offset and a y-offset within the area of the federated displays, a session identifier, and a depth.

Figure 11:
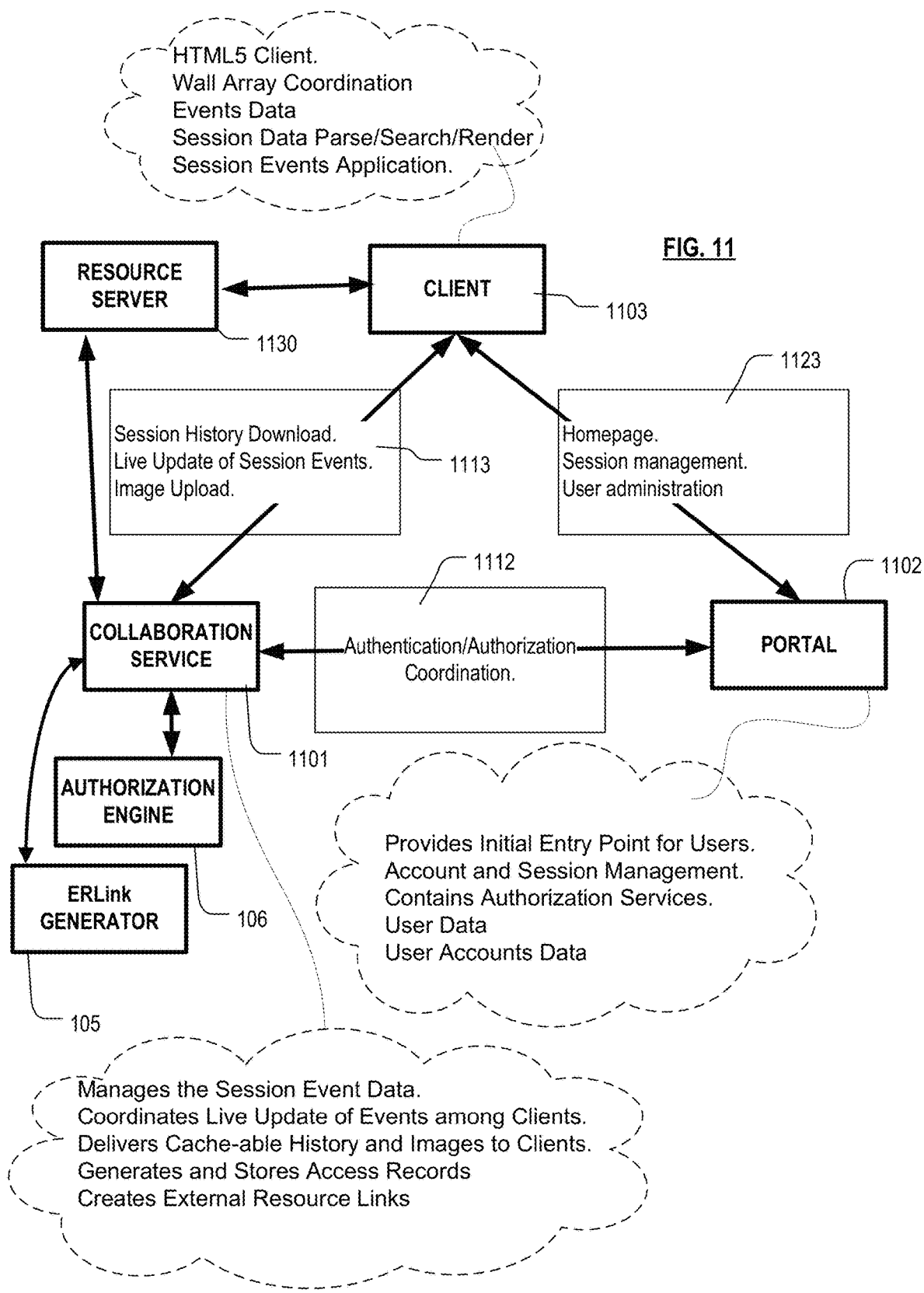
FIG. 11 is a simplified functional block diagram of a client-side network node.

FIG. 11 is a diagram representing a functional architecture for a distributed collaboration system used to create, modify, distribute and display workspace data for a workspace. The basic configuration includes a collaboration service 1101 which manages event data executed by a server, such as server 107, a portal service 1102 which can be executed by a server such as server 107 or located in other computer systems accessible to the server, such as a peer network node, and a display client 1103 located at a client-side network node, at which the user interaction is active. The display client 1103 is in communication with the collaboration service 1101 and with the portal 1102. The communication channel 1113 between the display client 1103 and a collaboration service 1101 manages the download of session history, and the live update of session events. Also, across this channel 1113, a display client 1103 can upload images that can be associated with events to the collaboration service 1101. The display client 1103 is in communication with the portal 1102 across communication channel 1123.

The portal 1102 manages a homepage for the workspace data, session management and user administration. This portal can be utilized for user login, authentications, and for delivering image files and the like as an alternative to, and in parallel with, the communication channel 1113. The collaboration service 1101 and portal 1102 are in communication across channel 1112. The collaboration service 1101, portal 1102 coordinate authentication and authorization protocols executed by the authorization engine 106, and coordinate session administration, and workspace data management. The collaboration service is also in communication with an ERLink generator 105. The ERLink generator can include logic to generate an external resource link for graphical objects with second level authorization.

The display client 1103 can be part of a client-side network node including a physical or virtual computer system having computer programs stored in accessible memory that provide logic supporting the collaboration session, including an HTML 5 client, wall array coordination logic for display array implementations, workspace data parsing searching and rendering logic, and a session events application to manage live interaction with workspace data at the server and the display wall.

The portal 1102 can be part of a server-side network node including a physical or virtual computer system having computer programs stored in accessible memory, that provide logic supporting user access to the collaboration server. The logic can include applications to provide initial entry points for users, such as a webpage with login resources, logic to manage user accounts and session anticipation, logic that provides authorization services, such as OAuth-based services, and account data.

The collaboration service 1101 can be part of a server-side network node including, and can manage the session event data, coordinate updated events among clients, deliver catchable history and images to clients, and control access to a database stored in the workspace data. The authorization engine is in communication with the collaboration service and can include logic to generate and store access records in an authorization table or another database. The external resource link generator or ERLink generator 105 is in communication with collaboration service 1101 and can create external resource links for graphical objects with second level authorization. The collaboration server 1101 is in communication with a resource server 1130. The resource server 1130 can be an external resource server storing digital assets. In some cases, the collaboration service can also be a resource server e.g., when a canvas object is used to provide second level authorization as described above. The client 1103 can also communicate with the resource server 1130 e.g., during user authentication process.

A spatial event map system can include an API executed in coordination by client-side and server-side resources including any number of physical and virtual machines. One example of an API is described below. An API can be defined in a variety of ways, while including the elements supporting maintenance of a spatial event map in a server-side network node or nodes, and supporting sharing of the spatial event map with one or a plurality of active client-side network nodes. In this example, the API is broken down in this example into processes managed by two servers:

Socket Requests Server (Websockets)—used for updating clients with relevant data (new strokes, cards, clients, etc.) once connected. This server can also handle the initial connection handshake.

Service Requests Server (HTTP/REST)—used for cacheable responses, as well as posting data (i.e., images and cards).

Client-side network nodes are configured according to the API, and include corresponding socket requests clients and service requests clients.

Figure 12:
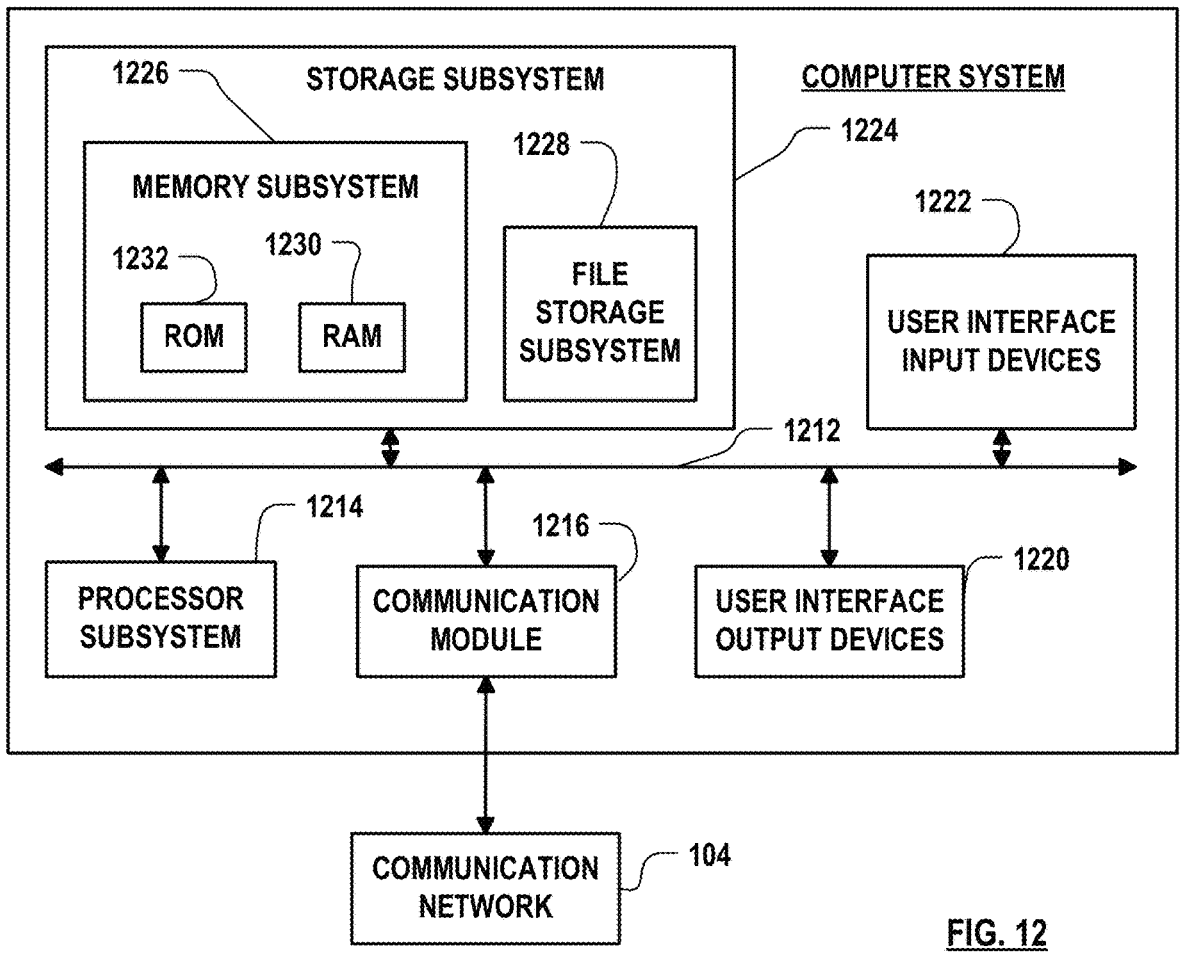
FIG. 12 is a simplified block diagram of the computer system 110, e.g., a client device computer system (FIG. 1B).

FIG. 12 is a simplified block diagram of a computer system, or network node, which can be used to implement the client-side functions (e.g., computer system 110) or the server-side functions (e.g., server 107) in a distributed collaboration system. A computer system typically includes a processor subsystem 1214 which communicates with a number of peripheral devices via bus subsystem 1212. These peripheral devices may include a storage subsystem 1224, comprising a memory subsystem 1226 and a file storage subsystem 1228, user interface input devices 1222, user interface output devices 1220, and a network interface subsystem communication module 1216. The input and output devices allow user interaction with the computer system. Communication module 1216 provides physical and communication protocol support for interfaces to outside networks, including an interface to communication network 104, and is coupled via communication network 104 to corresponding communication modules in other computer systems. Communication network 104 may comprise many interconnected computer systems and communication links. These communication links may be wireline links, optical links, wireless links, or any other mechanisms for communication of information, but typically it is an IP-based communication network, at least at its extremities. While in one embodiment, communication network 104 is the Internet, in other embodiments, communication network 104 may be any suitable computer network.

The physical hardware component of network interfaces are sometimes referred to as network interface cards (NICs), although they need not be in the form of cards: for instance, they could be in the form of integrated circuits (ICs) and connectors fitted directly onto a motherboard, or in the form of macrocells fabricated on a single integrated circuit chip with other components of the computer system.

User interface input devices 1222 may include a keyboard, pointing devices such as a mouse, trackball, touchpad, or graphics tablet, a scanner, a touch screen incorporated into the display (including the touch sensitive portions of large format digital display such as 102c), audio input devices such as voice recognition systems, microphones, and other types of tangible input devices. In general, use of the term "input device" is intended to include all possible types of devices and ways to input information into the computer system or onto communication network 104.

User interface output devices 1220 may include a display subsystem, a printer, a fax machine, or non-visual displays such as audio output devices. The display subsystem may include a cathode ray tube (CRT), a flat panel device such as a liquid crystal display (LCD), a projection device, or some other mechanism for creating a visible image. In the embodiment of FIG. 1B, it includes the display functions of large format digital display such as 102c. The display subsystem may also provide non-visual display such as via audio output devices. In general, use of the term "output device" is intended to include all possible types of devices and ways to output information from the computer system to the user or to another machine or computer system.

Storage subsystem 1224 stores the basic programming and data constructs that provide the functionality of certain embodiments of the present technology.

The storage subsystem 1224 when used for implementation of server-side network nodes, comprises a product including a non-transitory computer readable medium storing a machine-readable data structure including a spatial event map which locates events in a workspace, wherein the spatial event map includes a log of events, entries in the log having a location of a graphical target of the event in the workspace and a time. Also, the storage subsystem 1224 comprises a product including executable instructions for performing the procedures described herein associated with the server-side network node.

The storage subsystem 1224 when used for implementation of client-side network nodes, comprises a product including a non-transitory computer readable medium storing a machine-readable data structure including a spatial event map in the form of a cached copy as explained below, which locates events in a workspace, wherein the spatial event map includes a log of events, entries in the log having a location of a graphical target of the event in the workspace and a time. Also, the storage subsystem 1224 comprises a product including executable instructions for performing the procedures described herein associated with the client-side network node.

For example, the various modules implementing the functionality of certain embodiments of the technology may be stored in storage subsystem 1224. These software modules are generally executed by processor subsystem 1214.

Memory subsystem 1226 typically includes a number of memories including a main random access memory (RAM) 1230 for storage of instructions and data during program execution and a read only memory (ROM) 1232 in which fixed instructions are stored. File storage subsystem 1228 provides persistent storage for program and data files, and may include a hard disk drive, a floppy disk drive along with associated removable media, a CD ROM drive, an optical drive, or removable media cartridges. The databases and modules implementing the functionality of certain embodiments of the technology may have been provided on a computer readable medium such as one or more CD-ROMs, and may be stored by file storage subsystem 1228. The host memory subsystem 1226 contains, among other things, computer instructions which, when executed by the processor subsystem 1214, cause the computer system to operate or perform functions as described herein. As used herein, processes and software that are said to run in or on "the host" or "the computer," execute on the processor subsystem 1214 in response to computer instructions and data in the host memory subsystem 1226 including any other local or remote storage for such instructions and data.

Bus subsystem 1212 provides a mechanism for letting the various components and subsystems of a computer system communicate with each other as intended. Although bus subsystem 1212 is shown schematically as a single bus, alternative embodiments of the bus subsystem may use multiple busses.

The computer system itself can be of varying types including a personal computer, a portable computer, display wall, a workstation, a computer terminal, a network computer, a television, a mainframe, a server farm, or any other data processing system or user device. In one embodiment, a computer system includes several computer systems, each controlling one of the tiles that make up the large format display such as 102c. Due to the ever-changing nature of computers and networks, the description of computer system 110 depicted in FIG. 12 is intended only as a specific example for purposes of illustrating the preferred embodiments of the present technology. Many other configurations of the computer system are possible having more or less components than the computer system depicted in FIG. 12. The same components and variations can also make up each of the other devices 102 in the collaboration environment of FIGS. 1A and 1B, as well as the collaboration server 107 and database 109.

Certain information about the drawing regions active on the digital display 102c are stored in a database accessible to the computer system 110 of the display client. The database can take on many forms in different embodiments, including but not limited to a MongoDB database, an XML database, a relational database, or an object oriented database.

Figure 13:
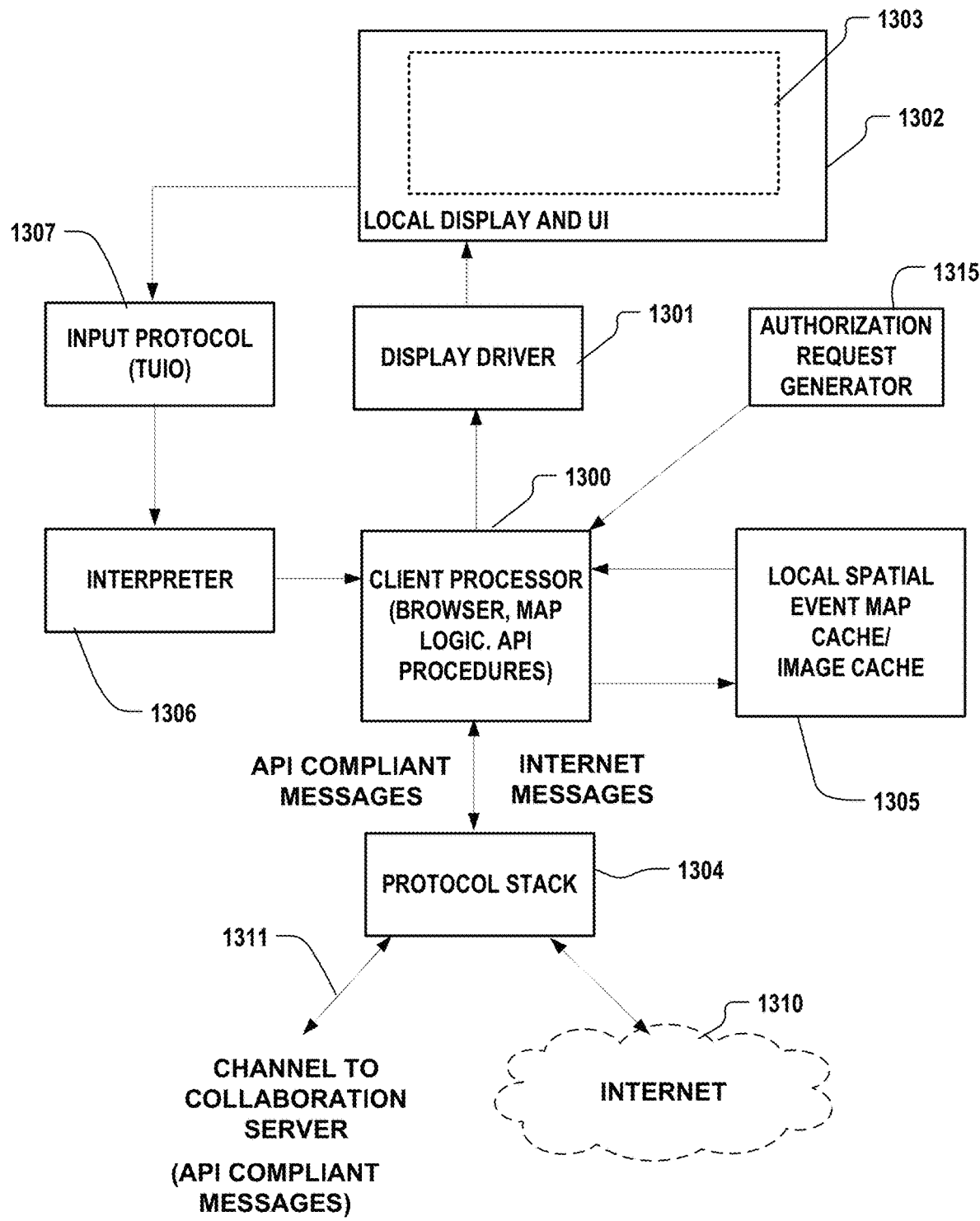
FIG. 13 is a simplified functional block diagram of a client-side network node and display.

FIG. 13 is a simplified diagram of a client-side network node, including a client processor 1300, a display client 1301, a local display 1302 and user interface such as a touchscreen 13, a protocol stack 1304 including a communication interface controlled by the stack, local memory 1305 storing a cache copy of the live spatial event map and a cache of images and other graphical constructs used in rendering the displayable area, and input protocol device 1307 which executes a input protocol which translates input from a tangible user input device such as a touchscreen, or a mouse, into a form usable by a command interpreter 1306. A suitable input protocol device 1307 can include software compatible with a TUIO industry-standard, for example for interpretation of tangible and multi-touch interaction with the display wall. The protocol stack 1304 receives API compliant messages and Internet messages from the client processor 1300 and as discussed above includes resources to establish a channel 1311 to a collaboration server across which API compliant messages can be exchanged, and a link 1310 to the Internet in support of other communications that serve the local display 1302. The display client 1301 controls a displayable area 1303 on the local display 1302. The displayable area 1303 can be logically configured by the client processor or other programming resources in the client-side network node. Also, the physical size of the displayable area 1303 can be fixed for a given implementation of the local display. The client processor 1300 can include processing resources such as a browser, mapping logic used for translating between locations on the displayable area 1303 and the workspace, and logic to implement API procedures.

The client-side network node shown in FIG. 13 illustrates an example including an application interface including a process to communicate with the server-side network node. The client-side network node shown in FIG. 13 illustrates an example configured according to an API, wherein the events include a first class of event designated as history events to be distributed among other client-side network nodes and to be added to the spatial event log in the server-side network node, and a second class of event designated as ephemeral to be distributed among other client-side network nodes but not added to the spatial event log in the server-side network node. The client-side network node can include an authorization request generator 1315 that can include logic to generate an authorization request to establish second level authorization.

Figure 14:
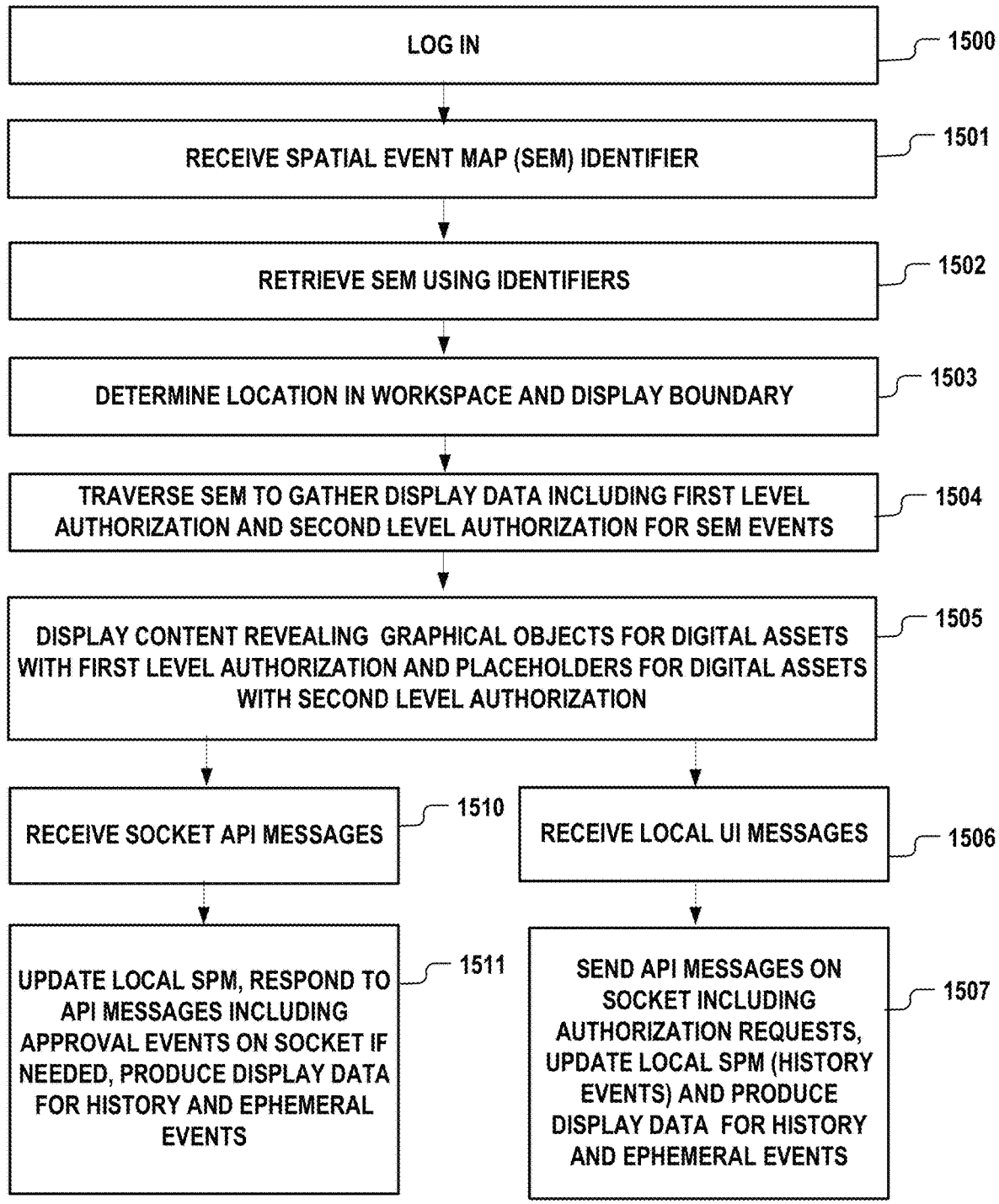
FIG. 14 is a flowchart illustrating operation of client-side network node like that of FIG. 13.

FIG. 14 is a simplified flow diagram of a procedure executed by the client-side network node. The order illustrated in the simplified flow diagram is provided for the purposes of illustration, and can be modified as suits a particular implementation. Many of the steps for example, can be executed in parallel. In this procedure, a client login is executed (1400) by which the client establishes a participant OID and is given access to a specific collaboration session and its spatial event map. As described above, this step can include a first level authorization to provide access by a participant OID to a workspace. The collaboration server provides an identifier of, or identifiers of parts of, the spatial event map (or SEM) which can be used by the client to retrieve the spatial event map from the collaboration server (1401). The client retrieves the spatial event map, or at least portions of it, from the collaboration server using the identifier or identifiers provided (1402).

For example, the client can request all history for a given workspace to which it has been granted access as follows:
curl http://localhost:4545/<sessionId>/history
The server will respond with all chunks (each its own section of time):
["/<sessionId>/history/<startTime>/<endTime>?b=1"]
["/<sessionId>/history/<startTime>/<endTime>?b=1"]
For each chunk, the client will request the events:
Curl http://localhost:4545/<sessionId>/history/<startTime>/<endTime>?b=<cache-buster>
Each responded chunk is an array of events and is cacheable by the client:
[
  [
    4,
    "sx",
    "4.4",
    [537, 650, 536, 649, 536, 648, . . . ],
    "size": 10,
      "color": [0, 0, 0, 1],
      "brush": 1
    },
    1347644106241,
    "cardFling"
  ]
]

The individual messages might include information like position on screen, color, width of stroke, time created etc.

The client then determines a viewport in the workspace, using for example a server provided focus point, and display boundaries for the local display (1403).

At a step 1404, the local copy of the spatial event map is traversed to gather display data for spatial event map entries that map to the displayable area for the local display. At this step the system traverses spatial event map to gather display data that identifies graphical objects with first level authorization and graphical objects with second level authorization for spatial map events. In some embodiments, the client may gather additional data in support of rendering a display for spatial event map entries within a culling boundary defining a region larger than the displayable area for the local display, in order to prepare for supporting predicted user interactions such as zoom and pan within the workspace.

The client processor executes a process using spatial event map events and display data to render parts of the spatial event map that fall within the viewport (1405). The system includes logic to display content revealing thumbnails or more detailed content revealing objects up to full resolution images, for digital assets requiring first level authorization and placeholders for digital assets requiring second level authorization. The first level graphical objects are displayed as content revealing thumbnails within window or frame graphical objects on the workspace. In case of placeholder graphical objects requiring second level authorization, the external resource proxy (ERProxy) can render a placeholder with a graphical user interface element such as a button to receive user input.

This process receives local user interface messages, such as from the TUIO driver (1406). Also, this process receives socket API messages from the collaboration server (1410). In response to local user interface messages, the process can classify inputs as history events and ephemeral events, send API messages on the socket to the collaboration server for both history events and ephemeral events as specified by the API, the API message can include authorization requests, update the cached portions of the spatial event map with history events, and produce display data for both history events and ephemeral events (1407). In response to the socket API messages, the process updates the cached portion of the spatial event map with history events identified by the server-side network node, responds to API messages on the socket as specified by the API, the API message can include approval events including authorization from content owner account, and produce display data for both history events and ephemeral events about which it is notified by the socket messages (1411).

Logging in and downloading spatial event map.
1. The client request authorization to join a collaboration session, and open a workspace.
2. The server authorizes the client to participate in the session, and begin loading the spatial event map for the workspace.
3. The client requests an identification, such as a "table of contents" of the spatial event map associated with the session.
4. Each portion of the spatial event map identified in the table of contents is requested by the client. These portions of the spatial event map together represent the workspace as a linear sequence of events from the beginning of workspace-time to the present. The "beginning of workspace-time" can be considered an elapsed time from the time of initiation of the collaboration session, or an absolute time recorded in association with the session.
5. The client assembles a cached copy of the spatial event map in its local memory.
6. The client displays an appropriate region of the workspace using its spatial event map to determine what is relevant given the current displayable area or viewport on the local display.

Connecting to the session channel of live spatial event map events:

1. After authorization, a client requests to join a workspace channel.
2. The server adds the client to the list of workspace participant OIDs to receive updates via the workspace channels.
3. The client receives live messages from the workspace that carry both history events and ephemeral events, and a communication paradigm like a chat room. For example, a sequence of ephemeral events, and a history event can be associated with moving object in the spatial event map to a new location in the spatial event map.
4. The client reacts to live messages from the server-side network node by altering its local copy of the spatial event map and re-rendering its local display.
5. Live messages consist of "history" events which are to be persisted as undue-double, recorded events in the spatial event map, and "ephemeral" events which are pieces of information that do not become part of the history of the session.
6. When a client creates, modifies, moves or deletes an object by interaction with its local display, a new event is created by the client-side network node and sent across the workspace channel to the server-side network node. The server-side network node saves history events in the spatial event map for the session, and distributes both history events and ephemeral events to all active clients in the session.
7. When exiting the session, the client disconnects from the workspace channel.

A collaboration system can have many, distributed digital displays which are used both to display images based on workspace data managed by a shared collaboration server, and to accept user input that can contribute to the workspace data, while enabling each display to rapidly construct an image to display based on session history, real time local input and real-time input from other displays.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "indicate" is used herein to mean the same as "identify".

Also as used herein, a given signal, event or value is "responsive" to a predecessor signal, event or value if the predecessor signal, event or value influenced the given signal, event or value. If there is an intervening processing element, step or time period, the given signal, event or value can still be "responsive" to the predecessor signal, event or value. If the intervening processing element or step combines more than one signal, event or value, the signal output of the processing element or step is considered "responsive" to each of the signal, event or value inputs. If the given signal, event or value is the same as the predecessor signal, event or value, this is merely a degenerate case in which the given signal, event or value is still considered to be "responsive" to the predecessor signal, event or value. "Dependency" of a given signal, event or value upon another signal, event or value is defined similarly.

Particular Implementations

We now present some example scenarios in which the technology disclosed can be used.

In a first example scenario, consider a group of users invited in a shared workspace with various levels of permissions such as read access, write access, full access, etc., for the full workspace at the content experience layer. However, this shared workspace can be layered with the content and data permission model. A subgroup (group 2) of group 1 may have access to certain documents or assets in the workspace. Therefore, the users or participant OIDs in the subgroup (group 2) can view or access the documents or assets in the shared workspace for which access has been granted to group 2.

The technology disclosed can provide a so-called "access control layering" at the content experience layers. The content can be accessed from an external source (such as a cloud-based data storage). The shared workspace can contain content by itself (i.e., locally stored content), from other data sources such as external data sources, or from another shared workspace which can be hyperlinked to the current workspace.

In a shared collaboration session (also referred to as a live session), if a member of group 2 is present (during the session) and is leading the session (live session leader), the leader can temporarily elevate permission to the other participant OIDs (followers) only for this session. Consider for example, one or more remote participant OIDs in the collaboration session are using a non-interactive digital display (also referred to as dumb digital display) to view the live session. In this case, the remote participant OIDs can only view the workspace. Remote participant OIDs may not be able to add comments to content (or assets/data) in the workspace.

In a second example scenario, the technology disclosed enables a user to select one or few digital assets in a workspace and can start an impromptu live collaboration audio and video (AV) session. This collaboration session can provide screen sharing, video and audio features while sharing only selected digital assets on the workspace. For the selected assets, the presenter can select, view only option for the live session for a guest user (or participant OID) or view with annotation capabilities for the guest. In one embodiment, the host (or leader) of the meeting can selectively approve or reject the annotation that can be permanently stored with the digital assets. The system can use a logic similar to the "canvas permission model" to establish second level authorization for multiple graphical objects in a group e.g., in a group selection or positioned inside a canvas object.

The technology disclosed can therefore provide systems and methods to have workspaces that can contain workspace assets (or digital assets), canvases, or other workspaces. Based on the security permission level, the system can enable various levels of access to users. For example, a user with an appropriate permission level access (or an appropriate level of security clearance) can drill down the workspace for more details of digital assets in the workspace.

Application Programmer Interface (API) Design

We now present some API calls that can be used to implement the technology disclosed.

/saveLongLivedTokenInfo

This API function is used by the interaction for the use case where the client (due to the nature of the ERS type) already has the authorization token information. That operation is available on the OAuth Storage.

Type: POST

Authentication: Account JWT cookie containing operative identity.

Body: ERLongLivedTokenInfo: Authorization token information to be saved. The scope value matches the OAuth scope used for the authorization used to select the external resource (e.g., using picker.)

Returns: HTTP 200 on success or 500 on failure with error information in the response body.

/acquireAndSaveLongLivedTokenInfo/{ersType}/{ersPrincipal}/{issuer}

This API function Invokes the ERS authorization endpoint to enter a code-grant OAuth flow for the purpose of acquiring long-lived token information. This causes the ERS to redirect to the /codeForTokenExchange where the token information is saved to OAuth Storage with the given ersType and scope as part of the composite key (along with the operative identity.)

The "default" oAuth scope used for the codeGrant is 'openid profile email offline_access User. Read Files. Read.all Files. ReadWrite.All'. See the extendedScope query parameter below for broadening this scope.

Before entering code code-grant OAuth flow, the oAuth storage is checked to see if a token already exists for the given operative identity. If so, then this method does nothing. For example, it will not extend the scope with the using the extendedScope parameter. The caller will need to explicitly delete the token.

Type: GET

Authentication: Account JWT cookie containing operative identity.

Path Parameters:
  (ersType ERSType): identifies the type of External Resource Server (e.g., "o365".)
  ersPrincipal (string): identifies the account at the ERS. Typically an email address.
  issuer (string): identifies the External Resource Server. For o365, this is the tenantId.

Query Parameters:
  extendedScope (optional string): Additional oAuth scope added to the default scope specified above. The long-lived token will have the combined scopes. The format is a space-separated string of scopes, such as:
  'People.Read Group.Read. All GroupMember.Read.All'. See also query parameter reAcquireIfTokenExists.
  reAcquireIfTokenExists: When true, this option causes a new token to be acquired/saved even when one already exists. This is useful when it's desired to request additional scope when a token already exists.
  clientRedirect (optional string): used to terminate the code-grant flow in the browser client. The clientRedirect can be any endpoint in the client containing at least one query parameter. If it exists then the redirect will be returned upon success. Otherwise 200 is returned.

/getRefreshedAccessToken

This API function looks up the user's token for the given external resource server type from token storage. Status 404 is returned if it does not exist. Otherwise, the access token is returned unless expired. If expired, a new access token is created using the refresh token, and that is returned after updating the token storage with new access/refresh tokens.

Type: GET

Authentication: Account JWT cookie containing operative identity.

Query Parameters:
  ersType (ERSType): identifies the External Resource Server.
  ersScope (string): URI-encoded containing the OAuth authorization scopes. The separator is ERS-dependent: for example, it may be space or comma. The string matches OAuth scope string used to select the external resource (e.g., using picker.)

Returns: HTTP 200 on success or 404 if the token does not exist; HTTP 500 on general failure with error information in the response body.

/codeForTokenExchange.

When /acquireAndSaveLongLivedTokenInfo invokes the ERS authorization endpoint (to enter the code-grant OAuth flow) it passes the endpoint to this operation. The ERS will invoke the endpoint passing a "code", which is used to fetch the authorization token information from the ERS via HTTP POST. The token information is saved to OAuth Storage (the authorization table in the federated authorization server).

Type: GET

Authentication: When /acquireAndSaveLongLivedTokenInfo invokes the ERS authorization endpoint, it generates, stores, and passes a random "state" variable which is then passed back to this method (/codeForTokenExchange.) Authentication is achieved by successfully retrieving the stored state variable.

Query Parameters: The query parameters vary by ERSType.

Returns: HTTP 200 on success or HTTP 500 on failure with error information in the response body.

ER Proxy

/proxy/{ersType}/{viewer Type(image L\image M\mage S|view|edit}?erInfo=<string>[&media Type=<string>] [&preflight=true]

This API function returns 302 redirect responses to HTTP GET requests. The redirect URLs are to web-based applications for viewing or editing external resources. If possible, the proxy will redirect to a web-native view, such as a Office365's web-based PowerPoint viewer. This allows the workspace user to interact with the resource, such as iterating through the slides. If no web-native view is available for the resource, then the redirect may be to an Enhanced Document Viewer (EDV) rendering a cached PDF version of the resource.

The ER-Proxy will need to fetch the operative identity's access token (from OAuth Storage) in order to generate the redirect URL with the proper credentials to view or edit the resource. That key is comprised of operative identity and scope. (The scope is passed as a path parameter and the header's client JWT cookie contains the operative identity information.)

Type: GET

Authentication: Collaboration application account JWT cookie containing operative identity.

Path Parameters:
  viewer Type (string): One of 'view' or 'edit'.
  ersType (ERSType): identifies the External Resource Server.
  scope (string): URI-encoded string containing the OAuth authorization scopes. The string has to be identical to that passed to /acquireAndSaveLongLivedTokenInfo since that is used for the token's compound key in the OAuth Storage. The value is stored in ERLink.

Query Parameters:
  erInfo: This ERS-specific string stored in the ERInfo's erLinkInfo field. See that interface and the discussion above for more details.
  mediaType: Optional media type of the resource type. This may be used to determine the type of view to use. For example MS word docs stored in o365 support a web based "office view" whereas non-office files do not. If omitted, a default view is used. (For o365, this is the "office" view.)

preflight: This optional boolean, when true, does not return a 302 redirect, but instead returns 200 or one of the error codes listed below. When a 200 is returned, the body will contain the redirect url. In cases where the viewerType is one of the image_types, then the body will also contain the ERS-specific metadata information for the resource. Example:
{"url":"https:// . . . ", "metadata":{"name":"my-powerpoint.pptx"}}

Return Values:
Upon success, returns a HTTP 302 redirect with an authorized viewer URL for the given viewerType—or if the preflight parameter is sent—will return a 200.

Data Structures

We now present example of selected data structures to implement the technology disclosed.

EROwner accountMetadata

This data structure describes the owner account of an external resource. It can include email address of the owner account to which the system can send a message to start the authorization procedure. The system can also use an optional OpenID profile information in the request message to request read/write permissions from the owner account for another identity.

```
interface EROwner accountMetadata {
    email: string;
    profile ?: OIDProfile; // see https://auth0.com/docs/scopes
    /current/oidc-scopes
    /**
     * If the external resource is available via shared or
       cloud-based drive (such as OneDrive or Google
       Drive) then this is the ERS-specific drive identifier.
     * For example, if required by the ERS, then this can
       be used to generate a native view/editor URL for
       a non-owner account.
     */driveId
    ?: string;
};
```

ERSType

This data structure identifies the type of External Resource Server. The ERSType is stored in the ERSLInk and used by the ER Proxy for generating links for viewers and editors. The ERSType is also part of compound keys in the OAauth Storage database. The length of the string can be 20 characters or more.

```
enum ERSType {
    // ERS types for the Collaboration application workspace app.
    bluejeans="bluejeans",
    box="box",
    dropbox="dropbox",
    gdrive="gdrive",
    o365="o365",
    photoshop="photoshop",
    shotgun="shotgun",
    slack="slack",
    skype="skype",
    youtube="youtube",
    zoom="zoom",
    // ERS types for 3rd party (plugin) apps can be added
       here. For example,
    //say that Shotgun Corporation develops a "plugin"
    // application that allows editing their content within
    // collaboration application.
    //This plugin may require slight differences in the
       OAuth flow
    // or different ERProxy handling. These values have to
       be named
    //differently than the collaboration application values
       above, using a short
    /// prefix. For example: sg_shotgun="sg_shotgun"
};
```

ERLink

This data structure includes resource and ERS-specific information to identify the linked resource as well as metadata about the resource owner account. The ERLink gets saved in spatial event map (Collab) events.

```
interface ERLink {
    // External resource owner account specific
    erOwner accountMetadata: EROwner accountMetadata;
    // ERS specific
    ersType: ERSType;
    ersScope: ERSScope;
    ersPrincipalCreatingLink: string; // String (typically an email
        //address) identifying the ERS principal that created
          the link.
    // Resource specific
    erInfo: ERInfo; // Information about the external resource.
};
```

ERInfo

This data structure includes resource-specific information used in an ERLink or ERLinkSet. The other parts of those interfaces contain resource owner account and ERS-specific information.

```
interface ERInfo {
    /**
     * Media type of the external resource or an empty string
       if resource has no media type. mediaType: string;
    /**
     * The "name" identifying the external resource in its local
       context. For example, a local file name in a drive-based
       ERS.
    */erLocalName:
    */
    string;
    /**
     * Workspace clients use ER Proxy URLs for displaying
       viewers for external resource links.
     * The ER Proxy URL includes viewer type ('edit') and
       ERS type ('o365'), for example:
    */erproxy/edit/o365/offline_access+Files.Read.all . . . .
     * The ersLinkInfo is the " . . . " part. It is an ERS-specific
       string that will be interpreted by the ER Proxy to return
       a redirect to an optimal viewer (such as a web-native
       viewer from the external resource server.)
     * The ER-Proxy can fetch the operative identity's access
       token (from OAuth Storage) in order to generate a
       redirect URL with the proper credentials to view or edit
       the resource. (The client cookie passed to the ERProxy
       contains the operative identity information.)
     *
     * The string needs to be URI encoded (JS encodeURIComponent). (The system may not perform the URI
       encoding due to nuances in some ERS-specific URLs.)
     * See ER Proxy API for more details.
     */
    erLinkInfo: string;
};
```

ERLinkSet

This data structure provides another way of transferring a list of ERLinks across a network where the common (owner account and ERS-specific) information needs to be passed only once rather once than for each ERInfo object. It can be used, for example, for sending link resources selected from a file picker to spatial event map with a single network operation.

```
interface ERLinkSet {
    // Owner account specific
       owner accountMetadata: EROwner accountMetadata;
    // ERS-specific
       ersType: ERSType;
       ersScope: ERSScope;
       ersPrincipalCreatingLink: string; // String (typically an email address) identifying the ERS principal that created the link.
    // Resource-specific
       erInfos: Array<ERInfo>;
};
```

ERSScope

This data structure can store ERS-specific scope information for an ERLink.

```
type ERSScope=string; // ERS-specific scopes. ERS-specific format, URI encoded.
```

ERLongLivedTokenInfo

OAuth authorization token information can be obtained from the ERS via a code grant flow. This data structure can contain information about the access and refresh tokens.

```
interface ERLongLivedTokenInfo {
    ersType: ERSType;
    ersScope: string; // ERS-dependent scope string.
    accessToken: string; // Access token.
    refreshToken?: string; // Null if ERS does not support refresh tokens.
    access TokenExp?: number; // Seconds from accessTokenCreatedAt until //expiry.
       Null if ERS does not support expiry for access tokens.
    refreshTokenExp?: number; // Null if ERS does not support refresh tokens or expiry for refresh tokens.
    access TokenCreatedAt: number; // Along with accessTokenExp, used to
       //determine when to refresh the access token.
       // This is represented as the number of //milliseconds since 1970 UTC.
    refreshTokenCreatedAt ?: number; // Similar to accessTokenCreatedAt
};
```

Operative Identity (OID)

```
interface OID {accountEmail: string; // Identifies collaboration system account spid: string;
};
```

In one context the use of the federated authorization server can include group of users (group 1) invited in a shared workspace, with various levels of permissions read/write/full etc. for the whole workspace at the content experience layer. However, this shared workspace is layered with the content/data permission model. Only subgroup (group 2) of group 1 may have access to certain document/assets.

Subgroup (group 2) can only see/access the restricted assets in the shared workspace.

In this access control layering at the content experience layer, the content may be coming from the externalized source. The "shared workspace" can hold content from by itself, or from other resources; or another "shared workspace" itself can be hyperlinked to the current workspace.

In a shared collaborative session (live session), if the member of the group2 is present (doing the session) and driving the session (live session leader), the leader can temporarily elevate permission to the other participants (followers) only for the session.

One way to describe an interaction, can be in a standard "dumb screen" share. The leader can allow remote participants who can't otherwise see the screen content, can see content during a live session. Now in this "dumb screen share case" remote participants can only see/view content. Remote participants cannot directly comment on the screen content/data.

The present technology can layer the permission model in a way, that remote participants (who may not have access to the digital assets otherwise) can just "view" during live session; leader can also give "annotation" and "edit" authorization. This can be considered as "remote projection view" in which a remote user can see the content via a so-called transparent glass. The system can make it nontransparent so that user cannot see the content. The user can annotate on top of this transparent glass. The system can control which annotation can pass through the transparent glass and applied to the digital assets. The system provides functionality to create selective holes in the glass and allow remote users to edit the content.

The system allows a user to randomly select few assets of the workspace and start an impromptu live collaborative AV (audio visual) session with another user. The collaboration session can include a live interactive workspace only for the selected assets on the screen. For those selected assets, the presenter can select, just view only live session for a guest participant, or view with annotation capabilities for the guest. The host can selectively approve or reject the annotation that can permanently stay on the digital assets.

The applicant hereby discloses in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. The applicant indicates that aspects of the present technology may consist of any such feature or combination of features. In view of the foregoing description, it will be evident to a person skilled in the art that various modifications may be made within the scope of the technology.

The foregoing description of preferred embodiments of the present technology has been provided for the purposes of illustration and description. It is not intended to be exhaustive or to limit the technology to the precise forms disclosed. Obviously, many modifications and variations will be apparent to practitioners skilled in this art. For example, though the displays described herein are of large format, small format displays can also be arranged to use multiple drawing regions, though multiple drawing regions are more useful for displays that are at least as large as 12 feet in width. In particular, and without limitation, any and all variations described, suggested by the Background section of this patent application or by the material incorporated by reference are specifically incorporated by reference into the description herein of embodiments of the technology. In addition, any and all variations described, suggested or incorporated by reference herein with respect to any one embodiment are also to be considered taught with respect to all other embodiments. The embodiments described herein were chosen and described in order to best explain the principles of the technology and its practical application, thereby enabling others skilled in the art to understand the technology for various embodiments and with various modifications as are suited to the particular use contemplated. It is intended that the scope of the technology be defined by the following claims and their equivalents.

What is claimed is:

1. A method for controlling display of a workspace, comprising:

during a shared collaboration session sharing the workspace with multiple client nodes, executing a protocol to establish a first level authorization at a display client on a network node participating in the shared collaboration session for a participant operative identity (OID), the first level authorization enabling access to a workspace data set of the workspace during the shared collaboration session, the workspace data set having a plurality of entries that identify respective digital assets and locations in the workspace for graphical objects representing the respective digital assets, and wherein the plurality of entries includes a particular entry identifying a particular digital asset requiring a second level authorization;

parsing the workspace data set to identify entries for digital assets having locations within a client viewport region of the workspace;

displaying graphical objects on a display at the display client representing the identified digital assets accessible with the first level authorization;

for the particular digital asset, communicating with an authorization server to return a result indicating status of second level authorization, and
 in response to a status indication that second level authorization is not established, displaying a placeholder graphical object at the display client, and
 in response to a status indication that second level authorization is established,
  displaying a graphical object representing the particular digital asset at the display client; and, when a placeholder graphical object is displayed, presenting a user interface object at the display client prompting execution of a protocol to establish second level authorization, and in dependence upon establishment of the second level authorization, replacing the placeholder graphical object with the graphical object representing the particular digital asset.

2. The method of claim 1, wherein
the particular digital asset is a file stored by a resource server, and
the graphical object is controlled by an external resource server.

3. The method of claim 1, wherein
the particular digital asset is a file stored by a resource server, and
the graphical object representing the particular digital asset is a thumbnail object.

4. The method of claim 1, wherein
the particular entry includes a resource link identifying the particular digital asset, and
the communicating with the authorization server includes sending the resource link to the authorization server.

5. The method of claim 1, wherein
the protocol to establish second level authorization includes
presenting a request login prompt with the placeholder graphical object, selection of which launches a user interface object for login of the display client to a resource server storing the particular digital asset.

6. The method of claim 1, wherein
the protocol to establish second level authorization includes
presenting a request permission prompt with the placeholder graphical object, selection of which launches a user interface object for requesting permission from an owner account for access to the particular digital asset from a resource server storing the particular digital asset.

7. The method of claim 1, including
displaying a prompt on the display for adding a digital asset to the workspace, and in response to the prompt, executing the second level authorization protocol to deliver a resource access token for the added digital asset requiring second level authorization to the authorization server with a scope of permissions for the participant OID, and adding an entry to the workspace data set including a resource link identifying the added digital asset.

8. The method of claim 7, wherein
the resource link identifying the added digital asset includes an owner account identifier, a storage server identifier, and an access scope identifier.

9. The method of claim 7, wherein
the resource link identifying the added digital asset includes an owner account identifier, a storage server identifier, an access group identifier, and an access scope identifier.

10. The method of claim 1, wherein
the workspace includes a canvas object defining a region in the workspace, and the workspace data set includes entries for digital assets having locations within the region defined by the canvas object;
and the method further including:
displaying, at the display client, a placeholder canvas graphical object and a canvas access prompt for requesting access to digital assets in the region defined by the canvas object; and
detecting user input indicating selection of the canvas access prompt, and in response executing a protocol to establish a canvas second level authorization; and
in dependence upon establishment of the canvas second level authorization, replacing the placeholder canvas graphical object with graphical objects representing the digital assets having locations within the region defined by the canvas object.

11. A system including one or more processors coupled to memory, the memory loaded with computer instructions to control display of a workspace, the instructions, when executed on the processors, implement actions comprising:

during a shared collaboration session sharing the workspace with multiple client nodes, executing a protocol to establish a first level authorization at a display client on a network node participating in the shared collaboration session for a participant operative identity (OID), the first level authorization enabling access to a workspace data set of the workspace during the shared collaboration session, the workspace data set having a plurality of entries that identify respective digital assets and locations in the workspace for graphical objects representing the respective digital assets, and wherein the plurality of entries includes a particular entry identifying a particular digital asset requiring a second level authorization;

parsing the workspace data set to identify entries for digital assets having locations within a client viewport region of the workspace;

displaying graphical objects on a display at the display client representing the identified digital assets accessible with the first level authorization;

for the particular digital asset, communicating with an authorization server to return a result indicating status of second level authorization, and in response to a status indication that second level authorization is not established, displaying a placeholder graphical object at the display client, and in response to a status indication that second level authorization is established, displaying a graphical object representing the particular digital asset at the display client; and, when a placeholder graphical object is displayed, presenting a user interface object at the display client prompting execution of a protocol to establish second level authorization, and in dependence upon establishment of the second level authorization, replacing the placeholder graphical object with the graphical object representing the particular digital asset.

12. The system of claim 11, wherein
the particular digital asset is a file stored by a resource server, and
the graphical object is controlled by an external resource server.

13. The system of claim 11, wherein
the particular digital asset is a file stored by a resource server, and
the graphical object representing the particular digital asset is a thumbnail object.

14. The system of claim 11, wherein
the particular entry includes a resource link identifying the particular digital asset, and the communicating with the authorization server includes sending the resource link to the authorization server.

15. The system of claim 11, wherein
the protocol to establish second level authorization includes
presenting a request login prompt with the placeholder graphical object, selection of which launches a user interface object for login of the display client to a resource server storing the particular digital asset.

16. The system of claim 11, wherein
the protocol to establish second level authorization includes
presenting a request permission prompt with the placeholder graphical object, selection of which launches a user interface object for requesting permission from an owner account for access to the particular digital asset from a resource server storing the particular digital asset.

17. The system of claim 11, further implementing actions comprising:
displaying a prompt on the display for adding a digital asset to the workspace, and in response to the prompt, executing the second level authorization protocol to deliver a resource access token for the added digital asset requiring second level authorization to the authorization server with a scope of permissions for the participant OID, and
adding an entry to the workspace data set including a resource link identifying the added digital asset.

18. The system of claim 17, wherein
the resource link identifying the added digital asset includes an owner account identifier, a storage server identifier, and an access scope identifier.

19. The system of claim 17, wherein
the resource link identifying the added digital asset includes an owner account identifier, a storage server identifier, an access group identifier, and an access scope identifier.

20. The system of claim 11, wherein
the workspace includes a canvas object defining a region in the workspace, and the workspace data set includes entries for digital assets having locations within the region defined by the canvas object; and further implementing actions comprising:
displaying, at the display client, a placeholder canvas graphical object and a canvas access prompt for requesting access to digital assets in the region defined by the canvas object; and
detecting user input indicating selection of the canvas access prompt, and in response executing a protocol to establish a canvas second level authorization; and
in dependence upon establishment of the canvas second level authorization, replacing the placeholder canvas graphical object with graphical objects representing the digital assets having locations within the region defined by the canvas object.

21. A non-transitory computer readable storage medium impressed with computer program instructions to control display of a workspace, the instructions, when executed on a processor, implement a method comprising:

during a shared collaboration session sharing the workspace with multiple client nodes, executing a protocol to establish a first level authorization at a display client on a network node participating in the shared collaboration session for a participant operative identity (OID), the first level authorization enabling access to a workspace data set of the workspace during the shared collaboration session, the workspace data set having a plurality of entries that identify respective digital assets and locations in the workspace for graphical objects representing the respective digital assets, and wherein the plurality of entries includes a particular entry identifying a particular digital asset requiring a second level authorization;

parsing the workspace data set to identify entries for digital assets having locations within a client viewport region of the workspace;

displaying graphical objects on a display at the display client representing the identified digital assets accessible with the first level authorization;

for the particular digital asset, communicating with an authorization server to return a result indicating status of second level authorization, and in response to a status indication that second level authorization is not established, displaying a placeholder graphical object at the display client, and in response to a status indication that second level authorization is established, displaying a graphical object representing the particular digital asset at the display client; and, when a placeholder graphical object is displayed, presenting a user interface object at the display client prompting execution of a protocol to establish second level authorization, and in dependence upon establishment of the second level authorization, replacing the placeholder graphical object with the graphical object representing the particular digital asset.

22. The non-transitory computer readable storage medium of claim 21, wherein
the particular digital asset is a file stored by a resource server, and
the graphical object is controlled by an external resource server.

23. The non-transitory computer readable storage medium of claim 21, wherein the particular digital asset is a file stored by a resource server, and the graphical object representing the particular digital asset is a thumbnail object.

24. The non-transitory computer readable storage medium of claim 21, wherein
the particular entry includes a resource link identifying the particular digital asset, and
the communicating with the authorization server includes sending the resource link to the authorization server.

25. The non-transitory computer readable storage medium of claim 21, wherein
the protocol to establish the second level authorization includes:
presenting a request login prompt with the placeholder graphical object, selection of which launches a user interface object for login of the display client to a resource server storing the particular digital asset.

26. The non-transitory computer readable storage medium of claim 21, wherein
the protocol to establish second level authorization includes:
presenting a request permission prompt with the placeholder graphical object, selection of which launches a user interface object for requesting permission from an owner account for access to the particular digital asset from a resource server storing the particular digital asset.

27. The non-transitory computer readable storage medium of claim 21, implementing the method further comprising:
displaying a prompt on the display for adding a digital asset to the workspace, and in response to the prompt, executing the second level authorization protocol to deliver a resource access token for the added digital asset requiring second level authorization to the authorization server with a scope of permissions for the participant OID, and adding an entry to the workspace data set including a resource link identifying the added digital asset.

28. The non-transitory computer readable storage medium of claim 27, wherein the resource link identifying the added digital asset includes an owner account identifier, a storage server identifier, and an access scope identifier.

29. The non-transitory computer readable storage medium of claim 27, wherein the resource link identifying the added digital asset includes an owner account identifier, a storage server identifier, an access group identifier, and an access scope identifier.

30. The non-transitory computer readable storage medium of claim 21, wherein
the workspace includes a canvas object defining a region in the workspace, and the workspace data set includes entries for digital assets having locations within the region defined by the canvas object; and implementing the method further comprising:
displaying a placeholder canvas graphical object and a canvas access prompt for requesting access to digital assets in the region defined by the canvas object; and detecting user input indicating selection of the canvas access prompt, and in response executing a protocol to establish a canvas second level authorization; and
in dependence upon establishment of the canvas second level authorization, replacing the placeholder canvas graphical object with graphical objects representing the digital assets having locations within the region defined by the canvas object.

31. A method for controlling display of a virtual workspace, comprising:
during a shared collaboration session sharing the virtual workspace with multiple client nodes, using a first level authorization protocol for at least one participant operative identity (OID) to authenticate and authorize at least one respective display client participating in the shared collaboration session to access the virtual workspace including a workspace data set stored on a server;
sending, from the server, data from the workspace data set to the at least one respective display client participating in the shared collaboration session, the workspace data set having a plurality of entries that identify respective digital assets and locations in the shared virtual workspace for graphical objects representing the digital assets, and wherein the plurality of entries includes an entry identifying a particular digital asset requiring second level authorization; and
accessing an authorization server that maintains resource access tokens usable to establish second level authorizations for display clients authorized to access the virtual workspace for content of the particular digital asset.

32. The method of claim 31, including
storing an authorization table accessible by the authorization server,
the authorization table including entries for the at least one participant OID storing the resource access tokens.

33. The method of claim 32, wherein
accessing the authorization server includes:
determining on behalf of a participant OID whether the authorization table includes valid access tokens for access to the particular digital asset by requesting participant OID, and if not, to
(i) cause display of a placeholder graphical object at the display client, and
(ii) cause display of a prompt at the display client linked to the requesting participant OID to launch a procedure to obtain a valid access token.

34. The method of claim 31, wherein
accessing the authorization server includes
determining on behalf of the at least one participant OID whether the display client seeking access to the particular digital asset is authenticated for access to a resource server storing the particular digital asset, and if not, to
(i) cause display of a prompt at a display client linked to the participant OID to login to the resource server, and
(ii) cause display of a prompt at a display client linked to the participant OID to launch a procedure to obtain a valid access token.

35. The method of claim 31, wherein
accessing the authorization server includes:
storing refresh tokens at an authorization table, and
executing a procedure in the authorization server to refresh the access tokens for participant OIDs.

36. The method of claim 31, wherein
the resource access tokens are virtual long-lived tokens.

37. A collaboration system, comprising
a workspace server including one or more processors coupled to memory, the memory loaded with computer instructions to control display of at least a portion of a virtual workspace, the instructions, when executed on the processors, implement actions comprising:
during a shared collaboration session sharing the virtual workspace with multiple client nodes, using a first level authorization protocol for at least one participant operative identity (OID) to authenticate and authorize at least one respective display client participating in the shared collaboration session to access the virtual workspace including a workspace data set stored on the workspace server; and
sending, from the workspace server, data from the workspace data set to the at least one respective display client participating in the shared collaboration session, the workspace data set having a plurality of entries that identify respective digital assets and locations in the virtual workspace for graphical objects representing the digital assets, and wherein the plurality of entries includes an entry identifying a particular digital asset requiring second level authorization; and
an authorization server, including one or more processors coupled to memory, the memory loaded with computer instructions, the instructions, when executed on the processors, implement actions comprising:
maintaining resource access tokens usable to establish second level authorizations for display clients authorized to access the virtual workspace for content of the particular digital asset.

38. The collaboration system of claim 37, the authorization server including
an authorization table in memory accessible by the authorization server,
the authorization table including entries for the at least one participant OID storing the resource access tokens.

39. The collaboration system of claim 38, wherein actions implemented using the authorization server include:
determining on behalf of a participant OID whether the authorization table includes valid access tokens for access to the particular digital asset by requesting participant OID, and if not, to
(i) cause display of a placeholder graphical object at the display client, and
(ii) cause display of a prompt at the display client linked to the requesting participant OID to launch a procedure to obtain a valid access token.

40. The collaboration system of claim 37, wherein
actions implemented using the authorization server include:
determining on behalf of the at least one participant OID whether the display client seeking access to the particular digital asset is authenticated for access to a resource server storing the particular digital asset, and if not, to
(i) cause display of a prompt at a display client linked to the participant OID to login to the resource server, and
(ii) cause display of a prompt at a display client linked to the participant OID to launch a procedure to obtain a valid access token.

41. The collaboration system of claim 37, wherein
actions implemented using the authorization server include:
storing refresh tokens at an authorization table, and
executing a procedure in the authorization server to refresh the access tokens for participant OIDs.

42. The collaboration system of claim 37, wherein
the resource access tokens are virtual long-lived tokens.

43. A non-transitory computer readable storage medium impressed with computer program instructions to control display of at least a portion of a virtual workspace, the instructions, when executed on a processor or processors implementing actions comprising:
during a shared collaboration session sharing the virtual workspace with multiple client nodes, using a first level authorization protocol for at least one participant operative identity (OID) to authenticate and authorize at least one respective display client participating in the shared collaboration session to access the virtual workspace including a workspace data set stored on a server;
sending data from the workspace data set on the server to the at least one respective display client participating in the shared collaboration session, the workspace data set having a plurality of entries that identify respective digital assets and locations in the shared virtual workspace for graphical objects representing the digital assets, and wherein the plurality of entries includes an entry identifying a particular digital asset requiring second level authorization; and
accessing an authorization server that maintains resource access tokens usable to establish second level authorizations for display clients authorized to access the virtual workspace for content of the particular digital asset.

44. The computer readable storage medium of claim 43, wherein the actions implemented include:
storing an authorization table accessible by the authorization server,
the authorization table including entries for the at least one participant OID storing the resource access tokens.

45. The computer readable storage medium of claim 44, wherein the actions implemented at the authorization server include:
determining on behalf of a participant OID whether the authorization table includes valid access tokens for access to the particular digital asset by requesting participant OID, and if not, to
(i) cause display of a placeholder graphical object at the display client, and
(ii) cause display of a prompt at the display client linked to the requesting participant OID to launch a procedure to obtain a valid access token.

46. The computer readable storage medium of claim 43, wherein the actions implemented at the authorization server include:
determining on behalf of the at least one participant OIDs whether the display client seeking access to the particular digital asset is authenticated for access to a resource server storing the particular digital asset, and if not, to
(i) cause display of a prompt at a display client linked to the participant OID to login to the resource server, and
(ii) cause display of a prompt at a display client linked to the participant OID to launch a procedure to obtain a valid access token.

47. The computer readable storage medium of claim 43, wherein the actions implemented at the authorization server include:
   storing refresh tokens at an authorization table, and
   executing a procedure in the authorization server to refresh the access tokens for participant OIDs.

48. The computer readable storage medium of claim 43, wherein the resource access tokens are virtual long-lived tokens.

* * * * *

UNITED STATES PATENT AND TRADEMARK OFFICE
CERTIFICATE OF CORRECTION

PATENT NO. : 12,111,894 B2
APPLICATION NO. : 17/200731
DATED : October 8, 2024
INVENTOR(S) : Steven Churchill et al.

It is certified that error appears in the above-identified patent and that said Letters Patent is hereby corrected as shown below:

In the Claims

In Claim 31, Column 44, Line 22, delete "shared" before -- virtual --.

Signed and Sealed this
Twelfth Day of November, 2024

Katherine Kelly Vidal
*Director of the United States Patent and Trademark Office*